United States Patent
Rungta et al.

(10) Patent No.: US 11,017,107 B2
(45) Date of Patent: May 25, 2021

(54) PRE-DEPLOYMENT SECURITY ANALYZER SERVICE FOR VIRTUAL COMPUTING RESOURCES

(71) Applicant: Amazon Technologies, Inc., Seattle, WA (US)

(72) Inventors: Neha Rungta, San Jose, CA (US); Pauline Virginie Bolignano, London (GB); Catherine Dodge, Seattle, WA (US); Carsten Varming, Brooklyn, NY (US); John Cook, Brooklyn, NY (US); Rajesh Viswanathan, Mercer Island, WA (US); Daryl Stephen Cooke, Lake Forest Park, WA (US); Santosh Kalyankrishnan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 353 days.

(21) Appl. No.: 15/913,741

(22) Filed: Mar. 6, 2018

(65) Prior Publication Data
US 2019/0278928 A1 Sep. 12, 2019

(51) Int. Cl.
*G06F 21/44* (2013.01)
*H04L 29/06* (2006.01)
*G06F 21/62* (2013.01)
*G06F 9/455* (2018.01)
*G06F 9/445* (2018.01)
*G06F 9/50* (2006.01)
*G06F 9/48* (2006.01)

(52) U.S. Cl.
CPC ...... *G06F 21/6218* (2013.01); *G06F 9/44505* (2013.01); *G06F 9/45533* (2013.01); *G06F 9/485* (2013.01); *G06F 9/5077* (2013.01)

(58) Field of Classification Search
CPC ... H04L 63/20; H04L 63/10; G06F 2221/034; G06F 21/44
See application file for complete search history.

(56) References Cited

U.S. PATENT DOCUMENTS

| 8,769,059 | B1 | 7/2014 | Chheda et al. |
| 2014/0033268 | A1* | 1/2014 | Julisch .................. H04L 63/20 726/1 |
| 2014/0282518 | A1 | 9/2014 | Banerjee |
| 2015/0163158 | A1 | 6/2015 | Ryland |

(Continued)

*Primary Examiner* — Izunna Okeke
(74) *Attorney, Agent, or Firm* — Davis Wright Tremaine LLP

(57) ABSTRACT

A security assessment system of a computing resource service provider performs security analyses of virtual resource instances, such as virtual machine instances and virtual data store instances, to verify that certain invariable security requirements are satisfied by the instances' corresponding configurations; these analyses are performed before the instances are provisioned and deployed. If the security checks, which can be selected by the administrator of the resources, fail, the requested resources are denied deployment. Notifications identifying the faulty configuration(s) may be send to the administrative user. A template for launching virtual resource instances may be transformed into an optimized template for performing the pre-deployment security checks, such as by storing information needed to perform the checks within the optimized template itself.

18 Claims, 13 Drawing Sheets

(56) References Cited

U.S. PATENT DOCUMENTS

2015/0199207 A1    7/2015   Lin et al.
2016/0156664 A1*   6/2016   Nagaratnam ........... G06F 21/62
                                                                             726/1

* cited by examiner

PRE-DEPLOYMENT SECURITY ANALYZER SERVICE FOR VIRTUAL COMPUTING RESOURCES

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual computing resources, such as virtual machines that appear and operate as independent computing devices to users of a data center. The single physical computing device can create, maintain, delete, or otherwise manage virtual resources in a dynamic manner. In some scenarios, various virtual machines may be associated with different combinations of operating systems or operating system configurations, virtualized hardware and networking resources, and software applications, to enable a physical computing device to provide different desired functionalities, or to provide similar functionalities more efficiently.

In turn, users can request computer resources from a data center, including single computing devices or a configuration of networked computing devices, and be provided with varying numbers of virtual machine resources. Virtualization also scales upward from virtual machines; entire data centers and even multiple data centers may implement computing environments with varying capacities, such as a virtual private network and a virtual private cloud. In a network of hardware computing devices, such as servers that are connected to each other to provide virtual computing resources and services to users of a computing resource service provider, there is great value in ensuring the security of resources and data. Access to resources can be tightly controlled based on many different parameters, such as user credentials, resource attributes, network configurations, and the like. Access rights of users and resources, in the context of a computing resource service provider, may be defined using security policies that specify whether to grant or deny a requesting device access to a computing resource. Network configurations can also have security policies, and/or can otherwise have parameters whose values determine the security of the network.

Access rights may change over time, often necessitating changes in affected security policies. Network controls may similarly change. As the number and types of users, and/or the number and types of accessible computing resources, that are supported in a computer system or computer network expands, it may become increasingly difficult to manage security policies, and to validate that computing resources are being made available with secure network configurations and effective security policies in place.

BRIEF DESCRIPTION OF THE DRAWINGS

Various techniques will be described with reference to the drawings, in which.

DETAILED DESCRIPTION

Figure 1:
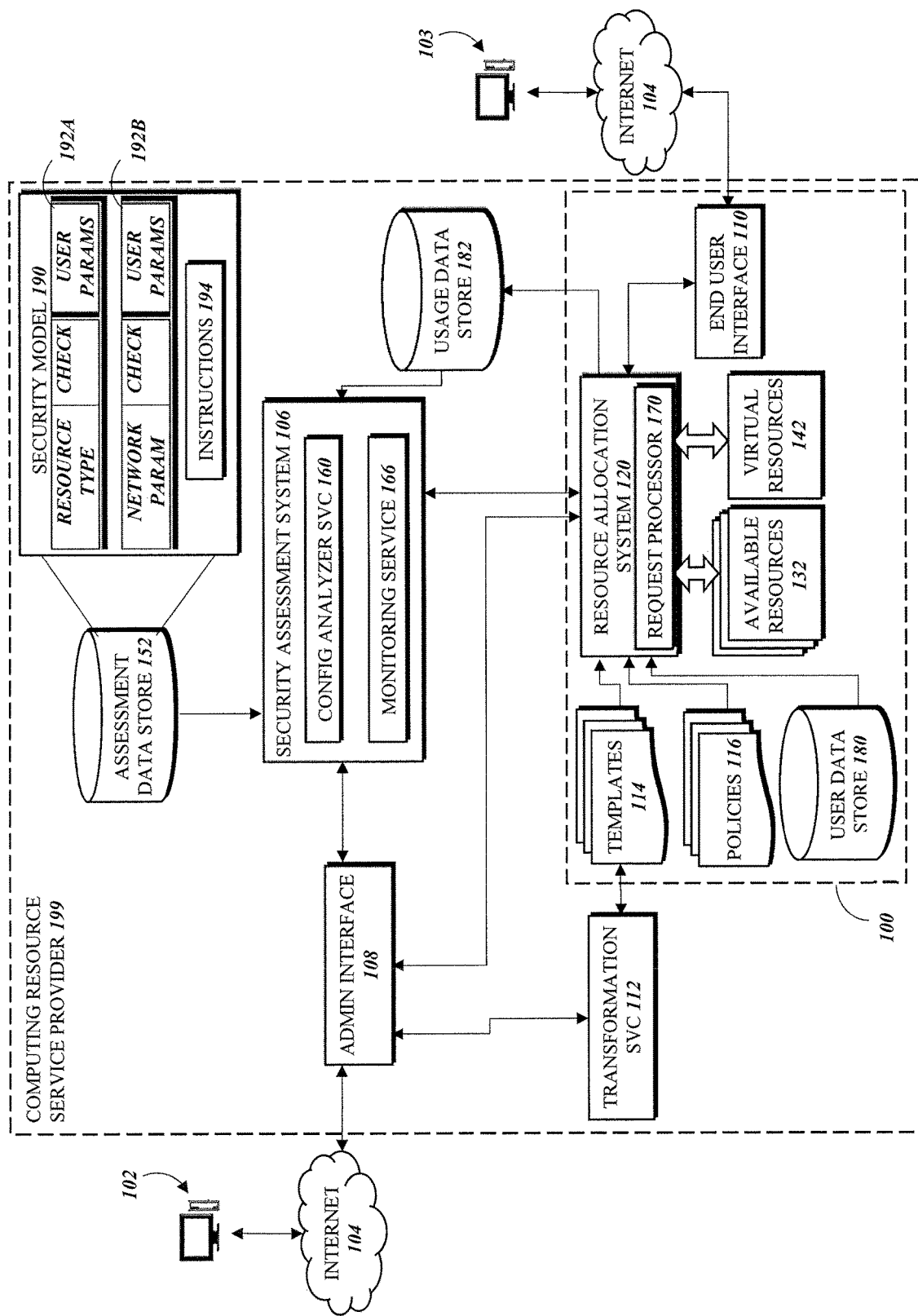
FIG. 1 illustrates a computing environment of a computing resource service provider, in which various embodiments of the present systems and methods can be implemented in accordance with this disclosure.

In the context of a computing resource service provider, a client makes requests to have computing resources of the computing resource service provider allocated for the client's use. One or more services of the computing resource service provider receive the requests and allocate physical computing resources, such as usage of a computer processor, memory, storage drives, computer network interfaces, and other components of a hardware computing device, to the client. In some computing systems, a virtualization layer of the computing system generates instances of "virtual" computing resources that represent the allocated portion of corresponding physical computing resources. Thus, the client may operate and control instances of virtual computing resources, including without limitation: virtual machine instances each emulating a complete computing device having an operating system, processing capabilities, storage capacity, and network connections; virtual machine instances or other containers for performing specific processes; virtual network interfaces each enabling one or more virtual machine instances to use an underlying network interface controller in isolation from each other; virtual data stores operating like hard drives or databases; and the like. The computing resource service provider may provision the virtual computing resources to the client in the client's own virtual computing environment(s), which can be communicatively isolated from the environments of other clients. The computing resource service provider may allow the client to configure its virtual computing resources so they can receive connections from the computing devices of end users; the client's virtual computing resources can provide software applications, web services, and other computing services to the end users.

One or more services of the computing resource service provider may, as described further below, be responsible for allocating a virtual computing resource, configuring the virtual computing resource, and deploying the virtual computing resource into the client's virtual computing environment. A client may create a configuration template that defines a particular class of virtual computing resources. For example, a "web server" configuration template may include parameters that have default and/or customizable values; a virtual machine instance adopts these parameters to operate as a web server within the client's virtual computing environment. The client may configure requests that specify the class of virtual machine instance as "web server," and the resource allocation system that processes the request may interpret the web server configuration template to "spin up" new virtual machine instances as web servers that have the same parameters.

Virtual computing resources are deployed into a client's virtual computing environment by creating the instance within corresponding resources allocated to the environment, and connecting the instance to other virtual computing resources and sometimes also to computing networks that interface with end user devices. In one implementation, the virtualization layer (e.g., containing one or more hypervisors) of the computing system generates one or more virtual networks within the environment, and a new instance receives an address (e.g., an IPv4 address) on the virtual network and can then communicate with other components on the virtual network. The virtual network may be attended by physical or virtual networking components such as network interfaces, firewalls, load balancers, and the like, which implement communication protocols, address spaces, and connections between components and to external communication networks (e.g., the internet and other wide-area networks). In various implementations, a client can configure various aspects of the virtual network and its attendant components. These configurations can create security vulnerabilities. For example, a client may configure a virtual network interface to serve as an "endpoint" with a publicly available IP address that end user devices can connect to (e.g., by typing the IP address into a browser program); the configuration may leave certain ports undesirably open to access by an end user device that is looking for open ports. The configuration of the virtual network should therefore be checked for security issues.

Additionally or alternatively, a client may create a security policy and associate the security policy with, for example, a particular end user, a group of end users, a particular virtual computing resource (e.g., a virtual machine instance), a particular type of virtual computing resource, a particular class of virtual computing resources, a computing network, traffic from a geographic area, and the like. Services of the computing resource service provider and/or the client that receive and evaluate requests by end users to access a virtual computing resource may use the security policy to determine whether to grant the requested access to the requesting user. In one example, the client may apply a security policy to a class of virtual computing resources by specifying the security policy in the configuration template described above; if the various components of the computing system are configured correctly, instances that are to be configured and launched using the template should be deployed with the specified security policy attached thereto (i.e., associated with, and controlling access to, the instance).

Some security policies can evaluate the interactions of virtual computing resource instances with the virtual network and other virtual computing resources executing in the client's virtual computing environment. Such policies may check properties of the instance that are not set until the instance has been created and is ready for deployment. For example, a policy for a virtual machine instance may check whether the instance's address places the instance inside or outside of a firewall on the virtual network; the instance needs to receive an address before the policy can evaluate the address's location. Parts of an instance's configuration that are evaluated by a policy may, in some implementations, depend on the client's configuration of the virtual network. Furthermore, the virtual network configuration may be changed while an instance is running, and/or between deployments of instances generated from the same template, such that values of checked parameters could change and need to be rechecked upon deployment and periodically thereafter.

The present disclosure provides systems and methods for performing proactive security checks on virtual computing resources, security policies, and network configurations within computing environments of a computing resource service provider, such as those described above. In particular, an embodiment of the provided system implements automated methods for evaluating the configuration of an instance of a virtual computing resource once the configuration is substantially or completely resolved, but before the instance is deployed into a virtual computing environment. Such evaluation may include comparing configuration parameters of the instance to a set of evaluation parameters embodying a proper configuration, such as a "security best practices" configuration. For example, the system can test whether the configuration exposes the instance, or other components of the virtual computing environment, to any of a plurality of "Common Vulnerabilities and Exposures" (CVEs), such as a setting that permits any end user device to access, read from, and/or write to allocated storage space of the instance.

A security policy as described above may be associated with the virtual computing resource, with one or more end users, and/or with other parameters of the virtual computing environment, such that the security policy attaches to, or otherwise controls access to, an instance of the virtual computing resource. In some embodiments, associating a security policy with, or attaching the security policy to, the instance includes creating a "resolved" security policy having no dependencies on external data (i.e., all parameters of the security policy have set values associated therewith), and then adding the security policy data to a record or data object (e.g., metadata) of the associated virtual resource instance. The system may check the elements of the instance's configuration that are determined by the attached security policy. If the check fails, the system may prevent deployment of the instance. In some cases, a client may be able to deploy a "stack" or collection of resources manageable as a single unit. A non-limiting example of a stack for providing a web application to end users includes a virtual machine configured to run as a web server, a data store for storing application data, and a security policy setting networking rules. The system may determine that the failed deployment affects an instance associated with the launch of a stack, and may terminate the stack or reiterate execution of the stack, such as by suspending or destroying one or more other resources that have already been allocated or deployed for the stack instance. Additionally or alternatively, the system may generate warnings to the client that describe the failed deployment and may identify the security policy/ies responsible for setting any offending parameters. The system may directly evaluate the security policy itself. In some embodiments, the system may fully prepare the instance for deployment before evaluating the security policy, so that any variables (e.g., references to other resources; input values) in the security policy are resolved for testing. In some cases, a security policy analyzer service may be utilized to compare security policies and determine whether two security policies are equivalent, whether a first security policy is more permissive than a second security policy, and more. If the evaluation fails, the system may receive a failure report from the security policy analyzer service, and may provide information to the client for correcting any misconfigurations caused by the security policy.

The system may allow an instance that passes the check to be deployed into the virtual computing environment as configured. Subsequently, the system may recheck the instance's configuration periodically or in response to a request or another triggering event. In some cases, a resource monitoring service may be utilized to collect configuration data and/or telemetry data from a monitored instance, and may perform (and/or cause the security policy analyzer service to perform) the same check(s) as, or different checks from, the pre-deployment evaluation. In one embodiment, the configuration and/or security policy is checked automatically over any appropriate time period. In another embodiment, the check occurs in response to a change to the security policy, to the instance configuration, or to configuration parameters of the virtual network.

In some cases, a request to launch an instance of a virtual computing resource identifies a configuration template, and the resource allocation system uses the identified template to set the initial configuration of a new instance and prepare the new instance for deployment. The template may identify one or more security policies to be attached to the instance, and may further include instructions or other data that configure the above-described evaluation of the security policies. For example, the template may identify which checks, from a set of preconfigured checks, should be run against the resources and security policies of the template. In some embodiments, the In some cases, a transformation service may be utilized to modify the template so that the transformed template causes the resource allocation system to (1) determine that pre-deployment security checks should be performed on the virtual computing resources to be launched, (2) request that the provider's security assessment system perform the identified checks, and (3) wait for a result of the security assessment before provisioning and/or deploying the corresponding virtual computing resource instance(s) or denying deployment thereof. In one embodiment, the transformed template may cause the resource allocation system to allocate resources to, and/or create, one or more virtual resource instances, as described further below, such that variables and references within configuration parameters and security policies of the original template can be fully resolved so that the configuration and/or security policy can be sent to and evaluated by the configuration analyzer service. The transformed template may further include, in a configuration for each of the resources that is associated with one of the security policies, a dependency that causes the resource allocation system to wait for a security policy to be successfully created and attached to a provisioned virtual resource instance before deploying the corresponding virtual resource instance.

Subsequent to the transformation of the template, the system may update existing resources (e.g., executing instances) to use the transformed template, and/or may use the transformed template to fulfill requests for new instances that identify the template. Additionally or alternatively, the system may utilize a template verification API to enable the client to perform the checks of the resources and security policies against the transformed template before the transformed template is used to allocate one or more virtual computing resources.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Referring to FIG. 1, embodiments of the present disclosure may operate within or upon computing systems of a computing resource service provider 199 accessible by users of user computing devices 102, 103 via a computer network 104 such as the internet. In particular, a "client," or administrator of the virtual computing resources to be deployed, may access the computing systems of the computing resource service provider 199 (e.g., using the client's user account credentials) using a computing device 102 to connect to a first user interface 108; an end user may access the client's virtual computing resources using a computing device 103 to connect to a second user interface 110 or another endpoint that connects to the computer network 104. The user interfaces 108, 110 may be websites, web applications, command consoles, and the like, as described further below.

The computing resource service provider 199 implements at least one virtual computing environment 100 in which users may obtain virtual computing resources that enable the users to run programs, store, retrieve, and process data, access services of the computing resource service provider 199, and the like. The virtual computing environment 100 may be one of any suitable type and/or configuration of a compute resource virtualization platform implemented on one or more physical computing devices. Non-limiting examples of virtual computing environments 100 include data centers, clusters of data centers organized into zones or regions, a public or private cloud environment, and the like. The virtual computing environment 100 may be associated with and controlled and managed by the client (e.g., via the user interface 108). In some embodiments, the virtual computing environment 100 of a particular client may be dedicated to the client, and access thereto by any other user of the computing resource service provider 199 prohibited except in accordance with access permissions granted by the client, as described in detail herein.

The computing resource service provider 199 may include data processing architecture that implements systems and services that operate "outside" of any particular virtual computing environment and perform various functions, such as managing communications to the virtual computing environments, providing electronic data storage, and performing security assessments and other data analysis functions. These systems and services may communicate with each other, with devices and services outside of the computing resource service provider 199, and/or with the computing environments. It will be understood that services depicted in the Figures as inside a particular virtual computing environment 100 or outside all virtual computing environments may be suitably modified to operate in the data processing architecture in a different fashion that what is depicted.

In general, the user computing devices 102, 103 can be any computing device such as a desktop, laptop, mobile phone (or smartphone), tablet, kiosk, wireless device, and other electronic devices. In addition, the user computing devices 102, 103 may include web services running on the same or different data centers, where, for example, different web services may programmatically communicate with each other to perform one or more techniques described herein. Further, the user computing devices 102, 103 may include Internet of Things (IoT) devices such as Internet appliances and connected devices. Such systems, services, and resources may have their own interface for connecting to other components, some of which are described below. Although one or more embodiments may be described herein as using a user interface, it should be appreciated that such embodiments may, additionally or alternatively, use any CLIs, APIs, or other programmatic interfaces.

A network 104 that connects a user device 102 to the computing resource service provider 199 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. In some embodiments, the network 104, may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Accordingly, a user of a user device 102, 103 may access the computing resource service provider 199 via a user interface 108, 110, which may be any suitable user interface that is compatible with the user device 102, 103 and the network 104, such as an API, a web application, web service, or other interface accessible by the user device 102, 103 using a web browser or another software application, a command line interface, and the like. In some embodiments, the user interface 108, 110 may include code and/or instructions for generating a graphic console on the user device 102, 103 using, for example, markup languages and other common web technologies. The first, or administrative, interface 108 may, via the connecting device 102, present a user with various options for configuring, requesting, launching, and otherwise operating virtual computing resources in one or more of the computing environments 100. The second, or end user, interface 110 may, via the connecting device 103, present a user with static, dynamic, and/or interactive content processed and provided via the virtual computing resources 142 executing the client's virtual computing environment 100. User input (e.g., text, computer files, selected elements from a list or menu, mouse clicks on buttons, and other interactions) entered into the user interface 108, 110 by the user may be received and processed by one or more components of the computing resource service provider 199, such as a security assessment system 106, a template transformation service 112, and/or one or more components in the computing environment 100, such as a resource allocation system 120.

For example, the client may use the user interface 108 to configure a virtual network, create templates 114 for launching virtual computing resources 142 and connecting them to the virtual network and/or the external communication network 104, and create security policies 116 that govern how end users can access the virtual computing resources. Such processes may generate records describing the client's and/or end users' user accounts and store the user account records in a user data store 180. The records may include information indicating that and end user associated with the user account is authorized or approved to request and use virtual computing resources in the computing environment 100. The information may describe limitations on the end user's ability to use virtual computing resources. For example, user account information may specify the types of virtual computing resources the end user is allowed to request and/or the actions (e.g., read, write, copy) the end user is allowed to perform. The client may further input other configuration settings that the system may later use to perform security assessments of virtual computing resources in accordance with the present disclosure.

A computing environment 100 may be configured to provide compute resources to users that are authorized to use all or part of the computing environment 100. Compute resources can include, for example, any hardware computing device resources, such as processor computing power/capacity, read-only and/or random access memory, data storage and retrieval systems, device interfaces such as network or peripheral device connections and ports, and the like. In some embodiments, these resources may be dispersed among multiple discrete hardware computing devices (e.g., servers); these hardware computing devices may implement or communicate with a virtualization layer and corresponding virtualization systems (e.g., a hypervisor on a server), whereby the compute resources are represented by, and made accessible as, virtual computing resources. A virtual computing resource may be a logical construct, such as a data volume, data structure, file system, and the like, which corresponds to certain compute resources. Non-limiting examples of virtual computing resources include virtual machines and containers (as described below), logical data storage volumes capable of storing files and other data, software programs, data processing services, and the like.

The computing environment 100 may be configured to allocate compute resources of corresponding hardware computing devices by virtualizing those resources to produce a fixed or variable quantity of available virtual computing resources 132. The available resources 132 may be provided in a limited manner to one or more users that submit requests for virtual computing resources within the computing environment 100; such resources that are allocated to and/or in use by a particular user are represented by virtual resources 142. Various functions related to processing requests to use virtual resources, to otherwise managing the allocation and configuration of the available resources 132 and allocated virtual resources 142, and to limiting the amount of virtual resources 142 that are allocated to a particular user in accordance with the present systems, may be performed by one or more services executing within the computing environment 100 and/or outside of it (i.e., in the data processing architecture of the computing resource service provider 199).

In some embodiments, as illustrated in FIG. 1, a resource allocation system 120 operating within the computing environment 100 may cooperate with a security assessment system 106 implemented outside of the computing environment 100 to manage the allocation of virtual resources according to security checks of the virtual resource configurations. In some embodiments, the resource allocation system 120 receives at least the communications that contain requests, commands, instructions, and the like (collectively herein, "requests"), to allocate, launch, execute, run, or otherwise provide, for use by an identifiable user (e.g., the requesting user or another specified user), one or more virtual computing resources in the computing environment 100. The request received by the security assessment system 106 may be generated directly by the client (e.g., using the administrative user interface 108) or by a connected end user (e.g., using the user interface 110), or the request may be generated as, or in response to, an output (e.g., a trigger event message) of another component of the computing resource service provider 199 or of an external device.

The resource allocation system 120 may include one or more services, implemented in software or hardware devices, for performing pertinent tasks. In some embodiments, the resource allocation system 120 may include a request processor 170 which is configured by executable program instructions to receive a request for virtual computing resources, parse the request into delivery and other parameters, determine whether the request can be fulfilled based on the available resources 132, the security assessments described herein, and other parameters, and if the request can be fulfilled, provide a virtual computing resource 142 configured for use according to the parameters of the request. The request processor 170 may additionally be configured to send the request, or some or all of the data contained in the request or describing the request, to the security assessment system 106 for associated processing as described herein. The request processor 170 or another component of the resource allocation system 120 may be configured to send to the user interface 108 information related to processing the request, such as error, completion, and other status messages.

The resource allocation system 120 may additionally collect and/or generate usage data describing aspects of the virtual computing resource 142. Non-limiting examples of such usage data may include: configuration and/or status parameters of the virtual computing resource 142 at the time of launch or failure to launch; information related to the processing of a request to use virtual computing resources; monitoring data collected by monitoring virtual computing resource 142 operations, such as network communications, data storage and retrieval and other disk access operations, execution of software programs, and the like; and, state data such as a snapshot of the state of the virtual computing resource 142 at the time it is provisioned, deploys, terminates, fails, or generates an error, or at any other time. The usage data may be stored in a usage data store 182 of the computing resource service provider 199. Additionally or alternatively, the usage data store 182 for a computing environment 100 may be implemented within the computing environment 100 itself. The usage data stored in the usage data store 182 may be accessible only to the client, or may be accessible by certain other systems and/or services. For example, the security assessment system 106 may, by default or by user authorization, access and use the usage data of one user or multiple users to update or interpret a security model 190 as described further below.

The security assessment system 106, based on the security model 190, information in the relevant template(s) 114 and security policy (or policies) 116, and the results of security assessments performed on user data, determines whether the proposed configuration of a requested virtual resource 142 satisfies client-provided security requirements before and after provisioning and deployment of the virtual resource 142. The security assessment system 106 may, in some embodiments, be a global (i.e., in communication with all computing environments of the computing resource service provider 199) system, and may be implemented in the data processing architecture of the computing resource service provider 199. For example, the security assessment system 106 may be part of a control plane that processes some of all of the network communications going into and coming out of the computing environments. In other embodiments, the security assessment system 106 may include one or more components, such as services, that are distributed within and across the computing environments. One or more component services, implemented in software or hardware, may perform the various discrete tasks described herein, or in some embodiments may cause them to be performed by other services. For example, in some embodiments the security assessment system 106 may itself perform security assessments of resource configurations, while in other embodiments the security assessment system 106 may send requests to another service external to the security assessment system 106 for assessment. Additionally or alternatively, the resource allocation system 120 may perform some or all of the security assessment system 106 tasks, as described further herein.

The security assessment system 106 may include a configuration analyzer service 160 that is configured to apply any suitable security assessment algorithms to available data in order to determine whether the proposed configuration of the requested virtual computing resource passes each of one or more security checks that are defined in the security model 190. In some embodiments, the client may designate a subset of the checks, or the type(s) of virtual resource(s) being requested may implicate a subset of the checks; generally, therefore, performing these checks may entail first determining, in accordance with a set of instructions 194, which checks are to be performed. Checks may be different types, such as a resource check associated with a certain resource type, or a network configuration check that is relevant when certain network devices or structures are in use. One example of a security model 190 is a database or other structured data store, which may be contained in, or referenced by, the assessment data store 152 or memory of the security assessment system 106 (e.g., a memory module of the hardware computing device(s) implementing the security assessment system 106). Such a database may include one or more records each containing information about a particular check. The information in a record may include a descriptor for the target of the check, information (e.g., referenced by the instructions 194) for executing the check, and optionally parameters and values provided by the user (i.e., the client) for customizing the check to operate against the user's virtual resources. In one embodiment, the security model 190 may be a "master" security model that describes all checks the security assessment system 106 can perform, and the instructions 194 or a separately stored data structure for each client account may identify the desired checks and user parameter/value pairs for the associated client. In another embodiment, a unique security model 190 containing the customer-specific information (i.e., checks selected by the client; user values submitted by the client) may be created and stored for each client account.

Resource checks may test for security vulnerabilities that may be common across one or more resource types including the associated resource type, or may be specific to the associated resource type. Non-limiting examples of resource-based security checks include: for a virtual machine instance, that the instance denies outbound traffic, does not open insecure communication ports (e.g., associated with unused protocols such as Telnet), and does not operate as a bastion host or honeypot (unless that is expressly the instance's class); for a data storage instance, that the instance encrypts data in transit, encrypts stored sensitive data, checks that connecting users are authenticated and authorized, and logs transactional information; for any virtual computing resource instance, that the instance denies all non-https traffic by specifying an explicit "deny" parameter; and, for a security policy, that the policy prohibits unrestricted public write access to a data store, and prohibits unrestricted public access to any virtual resource instance, security policy, and security setting. As explained herein, a resource checks may conform to security best practices. The parameters for executing a resource check may be stored, per the illustrated example, in a resource check record 192A contained in the security model 190. A resource check record 192A may contain information identifying the type of resource (e.g., virtual machine, data store, message queue, etc.) on which the check operates. The resource check record 192A may further contain information for performing the check, such as source code or executable files that the security assessment system 106 reads and/or executes. The resource check record 192A may additionally contain one or more parameters having stored values that are provided by the client (e.g., via the administrator interface 108); these parameter/value pairs can be used by the security assessment system 106 while performing the check, in order to customize performance of the check for certain target virtual resources and/or end user accounts. For example, if the check of the resource check record 192A tests whether unsecure ports into a virtual machine instance are open, the user-provided values may identify certain port numbers that do or do not need to be checked.

Network configuration checks may test for security vulnerabilities caused by the configuration parameters of physical and virtual network components, such as network adapters, routers, routing tables, gateways, load balancers, firewalls, proxy servers, virtual private network (VPN) servers, communication software, protocols (e.g., in the IP protocol stack), and the like. Such checks may also be based on security best practices, and can perform static and/or dynamic analysis of networks and network traffic. For example, a check may be a semantic analysis of a snapshot of the physical computing resources implementing the virtual computing environment 100. In another example, a check may evaluate connections between virtual resources (e.g., "does X resource connect to Y resource") or between a virtual resource and an external network (e.g., "can a public IP address connect to X resource on port Z"). In another example, the check may analyze telemetry data to determine whether network traffic has abnormal characteristics. The parameters for executing a network configuration check may be stored, per the illustrated example, in a network check record 192B contained in the security model 190. A network check record 192B may contain information identifying a parameter of the network or an object on the network that is the direct target (e.g., a routing table) or indirect target (e.g., a load balancer that connects to the target virtual resource) of the check. The network check record 192B may further contain information for performing the check, such as source code or executable files that the security assessment system 106 reads and/or executes. The network check record 192B may additionally contain one or more parameters having stored values that are provided by the client (e.g., via the administrator interface 108); these parameter/value pairs can be used by the security assessment system 106 while performing the check, in order to customize performance of the check for certain target virtual resources and/or end user accounts. For example, if the check of the network check record 192B tests whether a routing table connects resource X to resource Y, the client may provide an identifier of resource Y for storage in the network check record 192B.

The configuration analyzer service 160 may execute the checks against the corresponding configuration parameters to determine whether a security profile of the configuration is valid. In some embodiments, a validity determination may be a "yes" or "no" proposition: if the configuration does not confirm to a desired security profile, the request is classified as not valid. In other embodiments, the system may be configured to evaluate multiple levels of confidence that the user and the request are valid, and there may be multiple thresholds and/or ranges of values each representing a corresponding level of confidence. The specific metrics and thresholds guiding a determination as to whether a resource or a request is valid, as well as the security assessments scoring algorithms, and other methods for producing values for the metrics, can depend on many different aspects of particular implementations of the presently described systems. While some examples are described herein, the present systems are not limited to any particular approach to measuring the likelihood that activity is valid.

The security assessment system 106 may also include a monitoring service 166 that invokes the configuration analyzer service 160 or otherwise performs the checks against the virtual resource 142 configuration after the virtual resource 142 has been deployed. The instructions 194 and/or the relevant check records may specify a monitoring period and/or other properties of the monitoring to be performed. In one embodiment, monitoring may comprise, essentially, a periodic confirmation that the configuration of a virtual resource instance has not changed from its launch configuration. The monitoring service 166 may use the security model 190 and a confirmation interval (e.g., stored in the instructions 194) to perform the same checks that were performed pre-deployment, each time the confirmation interval elapses. In another embodiment, the monitoring service 166 may additionally or alternatively perform monitoring checks that are different and/or complementary to the pre-deployment checks. For example, the network check record 192B may include information (e.g., provided by the client as described above) describing acceptable network traffic to the virtual resource 142; the monitoring service 166 may obtain point-in-time and/or aggregate network traffic data and analyze it (or pass it to the configuration analyzer service 160) to determine whether the actual traffic conforms to the acceptable traffic parameters.

The configuration analyzer service 160 and monitoring service 166 algorithms may be stored in an assessment data store 152 as part of the security model 190 or separately therefrom. Additionally or alternatively, the security model 190 and/or other data in the assessment data store 152 may contain rules or rule sets that configure the services 160, 166 to apply one or more of the algorithms in accordance with predetermined parameters. Operating on target data, the configuration analyzer service 160 produces results that correspond to the desired security model 190. In various embodiments, the security model 190 may be designed to assess CVEs, deficiencies relative to security best practices, a custom set of security properties, etc. The assessment may be made, in various embodiments, using machine learning and other statistical models, and based on comparisons to historical patterns. The security assessment system 106 may be configured to produce results based on any available data, including without limitation any or a combination of: user data, such as user account information and user-supplied or automatically generated user profile data; usage data, such as data describing activity of virtual computing resources launched by the user or by other users; results from other security assessments, such as other types of assessments or previous assessments of the same type; and, information included in a request for virtual computing resources.

In some embodiments, the assessment data store 152 may include values for the security assessment parameters that are supplied by the client or an administrator of the corresponding user account. For example, an API such as the administrator user interface 108 may present prompts (e.g., graphically on the user device 102) for the administrator to enter values for any suitable parameter; the administrator may enter the values, and the security assessment system 106 may receive the values and store them in the assessment data store 152 in association with the security model 190. Such parameters and their associated values may be used as factors in the assessments (e.g., determination of the validity of a virtual resource configuration); thus, the administrator may identify what constitutes allowable (i.e., valid) configuration parameters, changing the parameters that the configuration analyzer service 160 will permit, if necessary.

In addition or alternatively to configuring, deploying, and managing a virtual network and compute resources of the virtual computing environment 100, the client may use the administrator user interface 108 to initiate the various security validation and/or remediation procedures described herein. Following are non-limiting examples of APIs that the user interface 108 may be or include to perform such procedures. A template creation API may enable the client to submit or program one or more templates 114 comprising virtual computing resource definitions and other parameters that the resource allocation system 120, and/or other systems of the computing resource service provider 199, use to allocate, configure, and deploy virtual computing resource instances into the virtual computing environment 100. A template 114 may be a logical representation of a virtual resource that can be instantiated in the virtual computing environment 100. A template 114 may conform to a template language that the corresponding systems are configured to interpret. For example, a template 114 may be a structured document written in an object-oriented programming language such as JavaScript Object Notation (JSON) or YAML. In some embodiments, a template creation API may enable the client to generate a template 114 based on the configurations of virtual computing instances 142 that are executing in the virtual computing environment 100 at that time. An example template is discussed below with respect to FIG. 3.

Similarly, a security policy creation API may enable the client to submit or program one or more security policies 116 generally comprising operational statements that are to be attached to virtual resource instances, user accounts, or the virtual computing environment 100 itself, to authorize certain users to perform certain actions on the virtual resource instances. A security policy 116 may be information (e.g., encoded in a file) that specifies one or more security permissions. Security permissions may be elements of the security policy 116 that define access rights associated with resources and/or principals of a system. For example, a permission may be used to grant or deny access to computing resources of a computing resource service provider. Policies may be expressed in a language independent format such as JSON or YAML. Examples discussed in this disclosure may be in JSON format or in a format similar to JSON and as illustrations of various embodiments which may be implemented. Of course, various other formats which may be utilized in the manner described in connection with JSON and JSON-like formats are also contemplated and within the scope of this disclosure. A security policy may include one or more permission statements as well as additional information such as versioning information and policy-wide information. In some cases, policy-wide information is included in a policy header at the beginning of a security policy 116 or may even be stored separately from (and in association with) a policy document. A security policy 116 may include multiple policy statements, such as those described elsewhere in connection with FIG. 3.

A validation API may enable the client to initiate a set of pre-deployment security checks at any time, such as immediately after the client creates a template 114 or security policy 116. For example, the validation API may generate a request that starts the virtual resource instance creation process described below with respect to FIGS. 2A-D; however, the validation API may control the resource allocation system 120 to terminate the process and release any allocated resources after the template 114 and/or policy 116 is confirmed to be valid but before the instances are actually deployed. Relatedly, if the instance creation fails due to a fault in the template 114 and/or policy 116, the validation API may receive a notification identifying the part of the template 114 or policy 116 that failed the security check(s), so the client can fix the error and rerun the validation.

A security settings API may enable the client to add parameters, change values for existing parameters, and otherwise modify configurations of the virtual computing environment 100 and corresponding virtual networks and virtual computing resources, in order to change or improve those aspects of the configurations that interact with security policies 112 or otherwise affect the security of the client's resources and data. For example, the client may be able to add, remove, or modify access control lists, authorized user profiles, security groups, and the like. A notification API may enable the client to access notifications, alerts, logs, and other information describing the activities of the various systems and services while launching (i.e., allocating physical resource, provisioning a virtual resource instance, and deploying the instance) and monitoring the instance. Such information may be stored, for example, in the usage data store 182 as described herein. A template transformation API may enable the client to cause the transformation service 112 to transform an identified template 114 from its original form into an optimized form that causes the resource allocation system 120 and the security assessment system 106 to perform the security checks before provisioning or deploying, and optionally also while monitoring, a virtual resource instance. An example transformation is described below with respect to FIG. 8.

In some embodiments, the security assessment results may be stored in the user data store 180 (e.g., in the corresponding user account records); to determine validity, the security assessment system 106 may simply retrieve the security assessment results from the user data store 180 and make the comparison to a stored threshold. In other embodiments, the validity comparison may be made in advance and the security assessment system 106 may retrieve the results of the comparison. In still other embodiments, the security assessment system 106 may send the security assessment result(s) to the corresponding resource allocation system 120, or another service, within a computing environment 100, which service may then make the comparison to the stored threshold(s).

FIGS. 2A-D present example operations, within a computing resource service provider 299 (which may be identical or similar to the computing resource service provider 199 of FIG. 1, or may be an entirely different type of system), by which a security assessment system 206 (as described above with respect to the security assessment system 106 of FIG. 1) performs pre- and post-deployment security checks (e.g., of the security model 190 of FIG. 1) of virtual resource instances in response to system activity. The example of FIGS. 2A-D is directed to verifying the compliance (e.g., with security best practices) of access and control permissions for virtual resource instances launching and executing within a particular network-accessible services system 210 that executes within a virtual computing environment 200 and is associated with a particular user of the computing resource service provider 299. A virtual machine instance 244 and a data store instance 246 are illustrated as examples; it is contemplated that the described operations can be adapted, without undue experimentation, for use on any type of virtual resource instances, including without limitation a message queuing service, a notification service, an end-user virtual computing environment, a load balancer, a serverless execution environment and/or virtual machine instances and container instances thereof, a machine learning service, a search engine, an analytics engine, a data encryption management service, and the like.

A resource allocation system 202 of the virtual computing environment 200 may perform any of the operations described above with respect to the resource allocation system 120 of FIG. 1. In particular, the resource allocation system 202 may receive requests to launch virtual machine instances within the virtual computing environment 200. In addition to sending the request, or parsing the request into parameters and sending some or all of the parameters, to the security assessment system 206, the resource allocation system 202 sends the request to a frontend 220 of a network-accessible services system 210 corresponding to the user associated with the request. The resource allocation system 202 may also receive messages from the security assessment system 206 that contain outcomes of requested and/or automated security assessments. In some embodiments, the resource allocation system 202 may maintain a data store 252, such as a database or other stored data structure, that contains a record for each user that has a valid user account and permission to use virtual computing resources within the computing environment 200. Such records may include a user identifier and sufficient information for the resource allocation system 202 and/or the frontend 220 or request processing module 222 to associate a user with a received request and/or to compare the user information to application security policies or other security settings implicated by the request. Detailed examples of this information are described below.

A network-accessible services system 210, or various constituents thereof, could implement various Web services components, hosted or "cloud" computing environments, and/or peer-to-peer network configurations to implement at least a portion of the processes described herein. The network-accessible services system 210 is depicted as operating in a distributed computing environment including several computer systems (e.g., servers 202) that are interconnected using one or more computer networks. The network-accessible services system 210 could also operate within a computing environment having a lesser or greater number of devices than are illustrated in FIGS. 2A-D. Additionally, there may be multiple network-accessible services systems associated with the user, which may all have the same configuration, or all different configurations, or a combination thereof. Thus, the depictions of the network-accessible services system 210 should be taken as illustrative and not limiting to the present disclosure.

Further, a network-accessible services system 210 may be implemented in hardware and/or software and may, for instance, include one or more physical or virtual servers implemented on physical computer hardware configured to execute computer executable instructions for performing various features that will be described herein. The one or more servers 202 may be geographically dispersed or geographically co-located, for instance, in one or more data centers. In some embodiments, the network-accessible services system 210 may be disposed in a computing environment 200 that is communicatively isolated from other computing environments (not shown) of the computing resource service provider 299. For example, the isolated computing environments (including virtual computing environment 200) may, in some embodiments, be "regions" of an overarching compute resource network implemented by the computing resource service provider 299; these regions may be independent of each other, and may represent a geographic area (e.g., Eastern United States, Western United States, and Europe may all be regions) of the overarching compute resource network. Such independence may mean that the compute resources made available in a particular region are dedicated to that region and are controlled by a regional instance of the network accessible services system, so as to isolate the region from other regions.

The network-accessible services system 210 may be connected to a communication network 204 that is implemented by or within the computing environment 200. The network 204 may, for example, be a virtual private network or another virtual network, or may include both physical and virtual components. In some embodiments, any of the components within the network-accessible services system 210 can communicate with other components of the computing environment 200 via the network 204. In other embodiments, not all components of the network-accessible services system 210 are capable of communicating with other components of the computing environment 200. In one example, only a frontend 220 may be connected to the network 204, and other components of the network-accessible services system 210 may communicate with other components of the computing environment 200 via the frontend 220. Additionally, the network 204 may be used to communicate with systems and resources inside the computing environment 200, such as the resource allocation system 202 and any local (i.e., instantiated within the virtual computing environment 200) data stores 252, and/or outside of the computing environment 200, such as the security assessment system 206 and other systems and resources in the data processing architecture of the computing resource service provider 299.

The frontend 220 may provide interfaces for exchanging data with external resources and devices, including a network interface 224 for sending and receiving data over communication networks, for example to communicate with the security assessment system 206. In one embodiment, the frontend 220 serves as a front door to all the other services provided by the network-accessible services system 210. The frontend 220 may receive and process (e.g., using a request processing module 222) all of the requests to launch virtual machine instances within the network-accessible services system 210. The frontend 220 may receive such requests using any suitable protocols, including, for example, HTTP, MQTT, and CoAP, as discussed above. Any metadata or other information (e.g., headers and parameters) included in the request may also be used to process the request.

Additionally, the frontend 220 may process messages from the security assessment system 206 and/or the resource allocation system 202. Alternatively, the frontend 220 may process and respond to messages from the resource allocation system 202 and/or the security assessment system 206 requesting information, such as the number of virtual machine instances associated with the user and concurrently executing on the network-accessible services system 210A. The frontend 220 may also process and respond to messages from the resource allocation system 202 and/or the security assessment system 206 requesting other information, such as usage data describing the execution of a particular virtual machine instance; or, the frontend 220 may be configured to automatically, such as at a particular time or in response to an event, send such information to the resource allocation system 202, to the security assessment system 206, or to a data storage service.

The frontend 220 may communicate with other components of the network-accessible services system 210 in order to launch and manage instances. For example, frontend 220 can include components such as a data store that stores information such as information about the currently running instances (i.e., identifiers of the instances, the servers the instances are running on, etc.) pending requests received to launch or terminate instances, as well as information about the slots available to host additional instances. The data store can be coupled to a scheduling service, which can use the data stored therein to launch and terminate virtual machines. The frontend 220, scheduling service, or another instance manager may manage an active pool 240 of virtual machine instances that are associated with a user/user account and that have been launched and are concurrently executing within the computing environment 200.

In some embodiments, the scheduling service can be configured based on a predetermined set of configurations, such as prescribed limits on available and executing virtual resources. As such, the network-accessible services system 210 can launch or terminate instances associated with a user based on the limits. In some embodiments, the network-accessible services system 210 may enable controlling (e.g., increasing or decreasing) the available capacity in the active pool 240. For example, a system administrator may use a setting represented in a user interface to increase the capacity (i.e., the maximum number of instances) in the active pool 240 during peak hours. In some embodiments, virtual machine instances in the active pool 240 can be configured based on a predetermined set of configurations, such as virtual machine images that incorporate settings pertaining to the tiered limits. The predetermined set of configurations can correspond to various types of virtual machine instances; for example, the active pool 240 can be configured to hold up to the limit of each type of virtual machine instance. The active pool manager can optimize types and numbers of virtual machine instances in the active pool 240 based on one or more metrics related to current or previous launch requests.

As described, the active pool 240 is a group (sometimes referred to as a pool) of virtual machine instances that are currently allocated to one or more users and are executing in response to a request to launch a virtual machine instance. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) and the security checks may be applied to the security group rather than individual users.

In some embodiments, the frontend 220 or a scheduling service managing the active pool 240 may maintain a list of instances in the active pool 240. The list of instances may further specify the configuration (e.g., type, OS, etc.) of the instances. The frontend 220 and/or the resource allocation system 202 may have access to this list and may use it to determine whether the limit on concurrently executing virtual machine instances has been reached. In another embodiment, the frontend 220 or scheduling service may be configured to determine the assigned tier and/or the associated limits for the computing environment 200, and may reject a command to launch another instance if the associated limit has been reached.

Figure 2A:
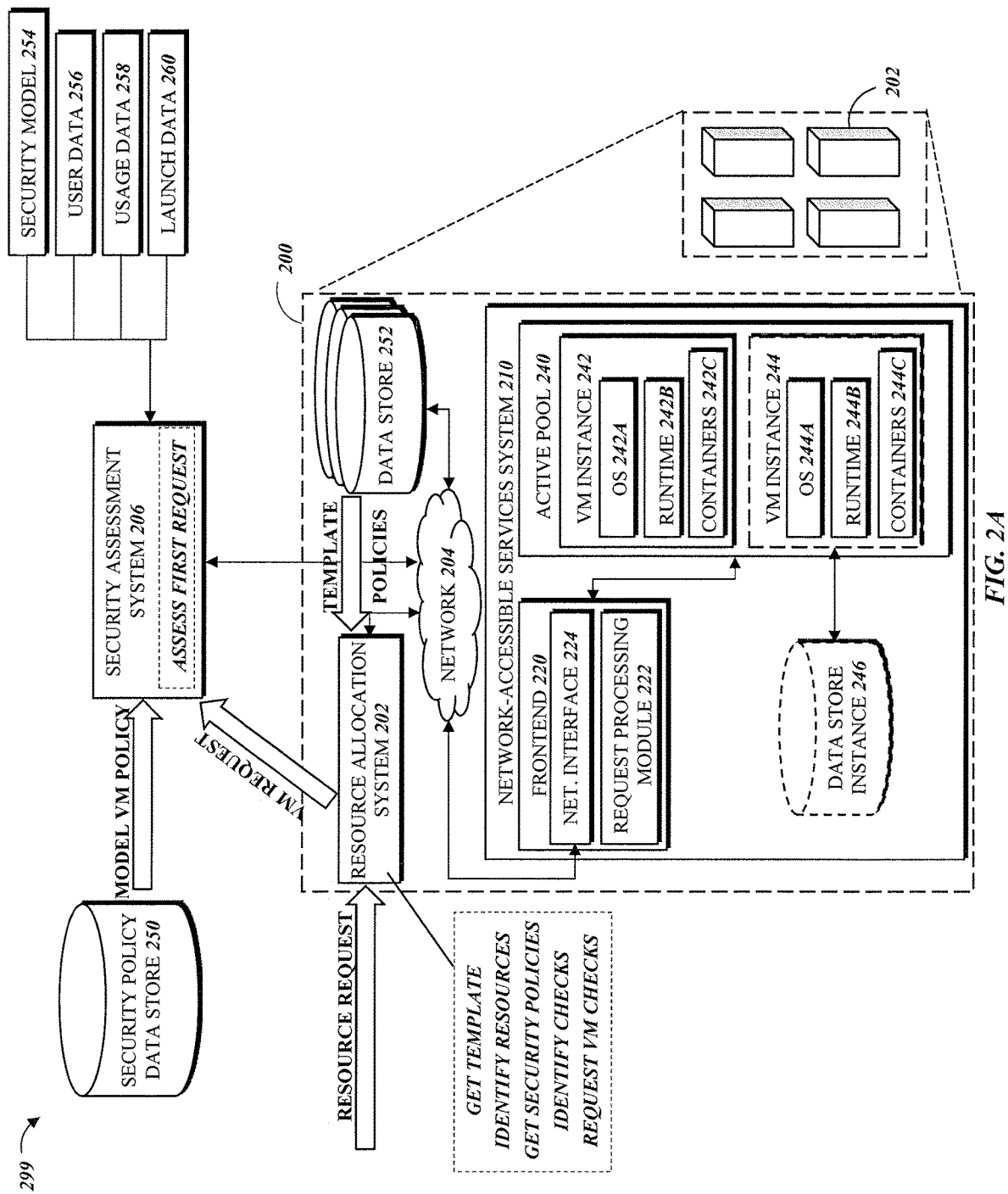
FIGS. 2A-D illustrate an example computing environment implementing a progression of an example method of checking virtual computing resource instances for security vulnerabilities before they are deployed, in accordance with the present disclosure.

In the depicted example, a first system state represented in FIG. 2A includes, for illustrative purposes, a virtual machine instance 242 already executing in the active pool 240. Another virtual machine instance 244 and a data store instance 246 are shown with a broken outline to indicate that these instances are requested by an incoming resource request and have not been launched, pending the outcome of the security checks as described below. Virtual machine instances may have operating systems (OS) and/or language runtimes loaded thereon. For example, the instance 242 has an OS 242A, a runtime 242B, and containers 242C; the instance 244 will be launched with an OS 244A, a runtime 244B, and containers 244C. Containers are logical units created within a virtual machine instance using the resources available on that instance. In one embodiment, such containers are implemented as Linux containers. The virtual machine instances in the active pool 240 may have one or more containers created thereon and have one or more program codes associated with the user loaded thereon (e.g., either in one of the containers or in a local cache of the instance). Each container may have credential information made available therein, so that user codes executing on the container have access to whatever the corresponding credential information allows them to access. Similarly, a data store instance may have credential and other access information made available therein, in addition to default data store parameters such as the storage volume, file system, and the like.

The illustration of the various components within the network-accessible services system 210 is logical in nature and one or more of the components can be implemented by a single computing device or multiple computing devices. In some embodiments, the network-accessible services system 210 may comprise multiple frontends, multiple active pools, and other execution spaces for various types of virtual resources. The embodiments described herein are not limited by the illustrated amount of deployed and requested resources, and one skilled in the art will appreciate that the network-accessible services system 210 may comprise any number of virtual resource instances implemented using any number of physical computing devices 202.

In accordance with the example system depicted in FIG. 1, FIGS. 2A-D illustrate several types of system data that can be received by or made available to the security assessment system 206 in order to perform the pre- and post-deployment security checks. A security model 254 may include the model 190 of FIG. 1 or its discrete components such as the various defined security checks and instructions for performing the checks, as well as additional information related to the security model. User data 256 may include user account data, user profile information, user-submitted and/or derived user preferences, user-submitted configuration settings, results from previous security assessments related to the user or user account, and the like. For example, the user data 256 may identify a subset of the checks defined in the security model 254, which the user wants performed on one or more types of virtual resources available for deployment in the network-accessible services system 210. Usage data 258 may be any static or dynamic monitoring data described above, and may include usage information, which may be raw data or pre-analyzed data, pertaining to usage of the system by some or all other users. For example, the usage data 258 may include aggregate data describing the frequency at which requested resources are passing or failing the security checks; if such a frequency is too high, the data may serve as an indication to the security assessment system 206 that significant changes to the virtual network configuration have propagated, or the system is being attacked by hackers. Launch data 260 may include any information, such as virtual machine images, virtual machine instance templates, state data from prior instance executions, and parameter values and other information obtained from the request and/or previous similar launch requests, which can be used to refine or otherwise configure the launch of requested virtual resources.

In some embodiments, the security assessment system 206 may connect to a security policy data store 250 that contains model security policies, against which the security assessment system 206 may compare the client's security policies. Model security policies may include, for example, a set of best practices policies corresponding to all or various individual types of virtual resources. The best practices policies may be a set of security policies that are determined to be a set of permissions which should not be allowed. For example, a first best practices policy may be that a particular data container should not be world-writeable (e.g., any principal, even a guest user or anonymous user can write to the container). The API may verify that best practices policies are being followed by determining that the received policy is not more permissive than each of the best practices policies. Examples of best practices policies may include resources being world writeable, world readable, world accessible, and the like. In some embodiments, a collection of best practices policies may be determined based on user input, the type of computing resource requested, and other context information. For example, a computing resource service provider may support several services for various types of computing resources, and the set of best practice rules may differ based on the type of computing resource the security policy applies to.

Figure 2B:
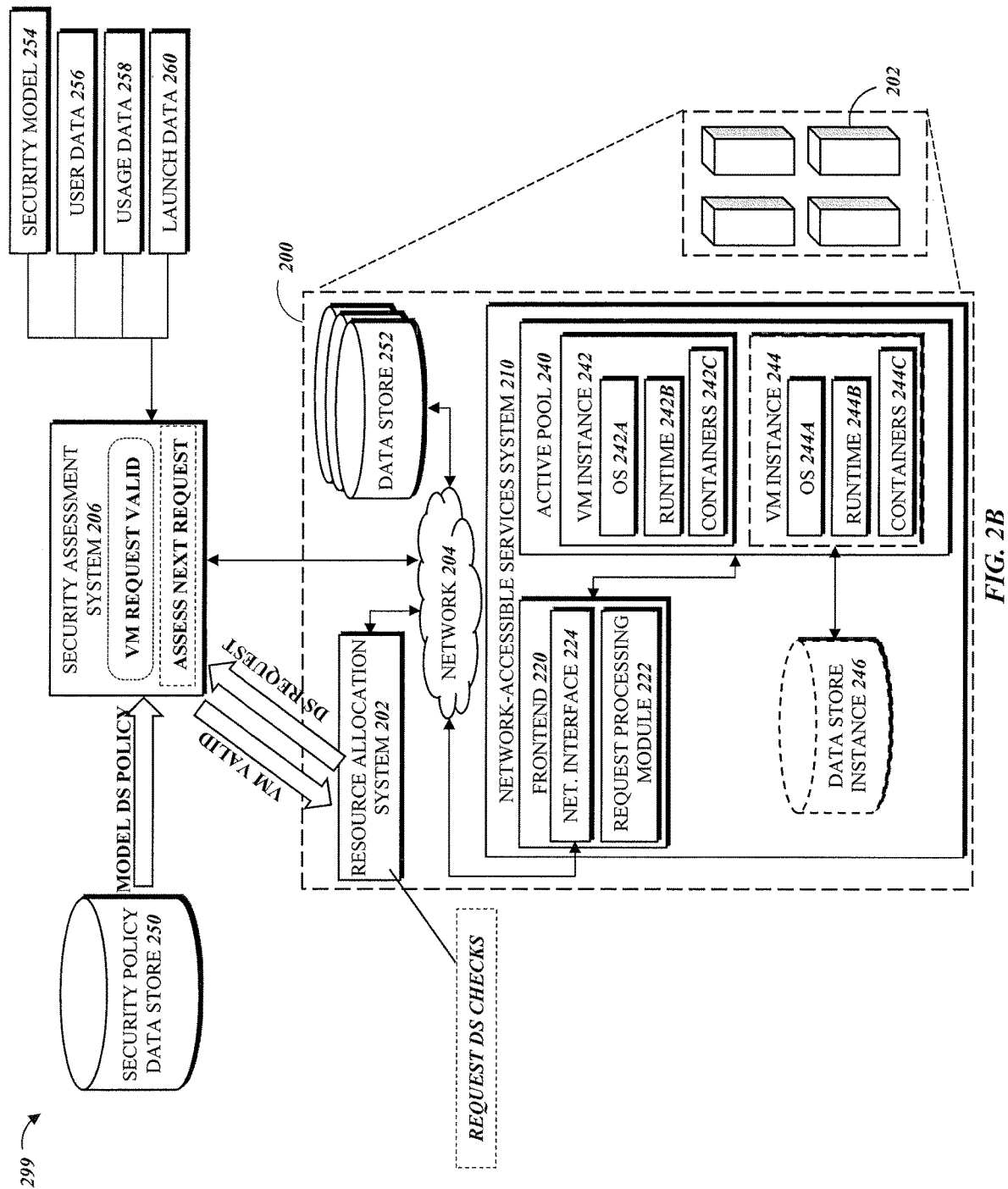
Figure 2C:
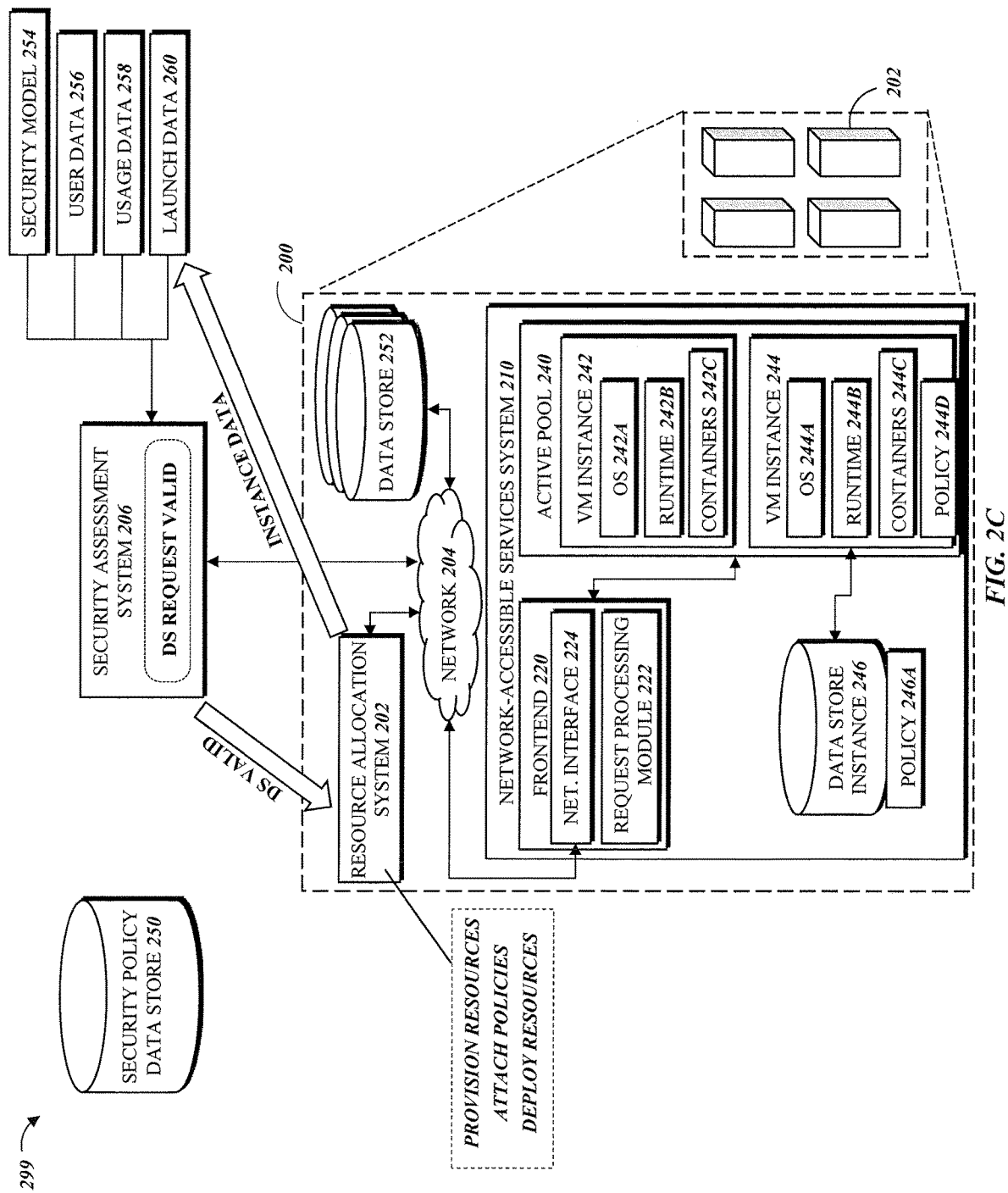

In the context of the above system, FIGS. 2A-C illustrate an example data processing flow whereby virtual resource instances are checked for security vulnerabilities before they are deployed. Referring to FIG. 2A, a request for virtual resources is received by the system. The request may originate in user input from an end user, or from a command issued by the client, or from another triggering event, and may be received by the resource allocation system 202, via the frontend 220 in some embodiments. The request may be for a single virtual resource instance, a plurality of instances of a virtual resource type, or a plurality of instances of multiple resource types, where the instances may or may not be interconnected in some fashion. For example, and as illustrated, the request may be to create a "stack" of multiple resources—specifically, a virtual machine instance and a data store instance that the virtual machine instance can access. The request may identify a template (i.e., template 114 of FIG. 1), which may be stored in a local data store 252 or another data store. The resource allocation system 202 may obtain the identified template and use the template to determine that a virtual resource instance 244 and a data store instance 246 should be prepared for launch in accordance with the resource definitions of the template, as explained further below. The template may further specify the security checks to be performed against the virtual resource instance configurations before deployment; additionally or alternatively, the request may include some or all of the security checks.

The resource allocation system 202 may identify the security checks and send them, together with the proposed configurations of the virtual resource instances, to the security assessment system 206. In one embodiment, the resource allocations system 202 may send all of the checks and all of the configurations to the security assessment system 206 at once, and the security assessment system 206 may determine which checks are application to each of the requested resource types. In the illustrated embodiment, the resource allocation system 202 may identify the security checks that are associated with the virtual machine resource type, and may send the identified checks and the proposed virtual machine instance 244 configuration (derived from at least the template) to the security assessment system 206 as a first request for the security checks to be performed. Using the security model 254 and/or a model virtual machine security policy from the security policy data store 250, the security assessment system 206 may perform the security checks against the first request.

Referring to FIG. 2B, assuming the virtual machine instance 244 configuration passes the security checks, the resource allocation system 202 receives a signal from the security assessment system 206 indicating that the configuration is valid. The resource allocation system 202 may then format and send a second request for security checks of the data store instance 246 configuration. Assuming the data store instance 246 configuration passes the corresponding security checks, the resource allocation system 202 receives a signal from the security assessment system 206 indicating that the configuration is valid. As shown in FIG. 2C, the resource allocation system 202 may then provision the virtual resource instances 244, 246 as described above, attach the corresponding security policies 246A, 244D to the virtual resource instances 244, 246, and deploy the instances 244, 246 into the network-accessible services system 210. The resource allocation system 202 may also send information about the launch of the instances to the data stores containing the user data 256, usage data 258, and/or launch data 260.

Figure 2D:
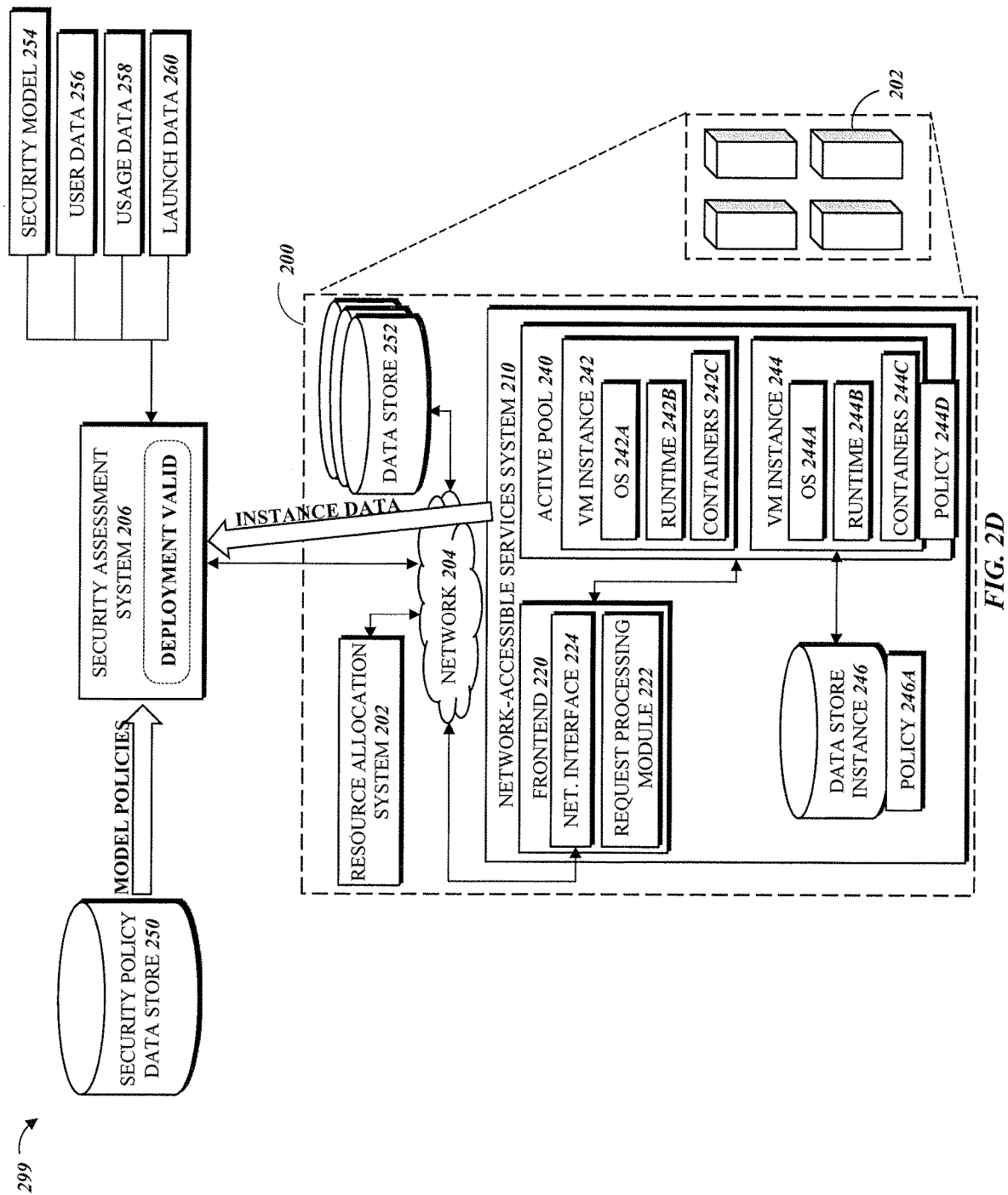

Referring to FIG. 2D, once the requested virtual resource instances 244, 246 are deployed, the security assessment system 206 may further monitor the executing instances 244, 246 and re-check the security checks to confirm the configurations have not become invalid. In some embodiments, the security assessment system 206 may interact directly with the executing instances 244, 246. For example, if one of the checks against the data store instance 246 is to confirm that the data store instance 246 is not world-writeable (i.e., any connecting end user can upload data to the data store instance 246, the security assessment system 206 may emulate an end user device connected to the frontend 220 (e.g., from a "puppet" IP address representing an address of a device external to the computing resource service provider 299) and submit a request to upload a file to the data store instance 246, without providing authorized user credentials. If the upload is accepted, the data store instance 246 may have become world-writeable, and an alert or notification may be generated. The security assessment system 206 may perform the monitoring automatically or in response to user input or a triggering event, such as a new instance launch; the checks may be repeated any desired number of times, at any desired interval, and for a specified period of time or for the lifetime of the instance.

Figure 3:
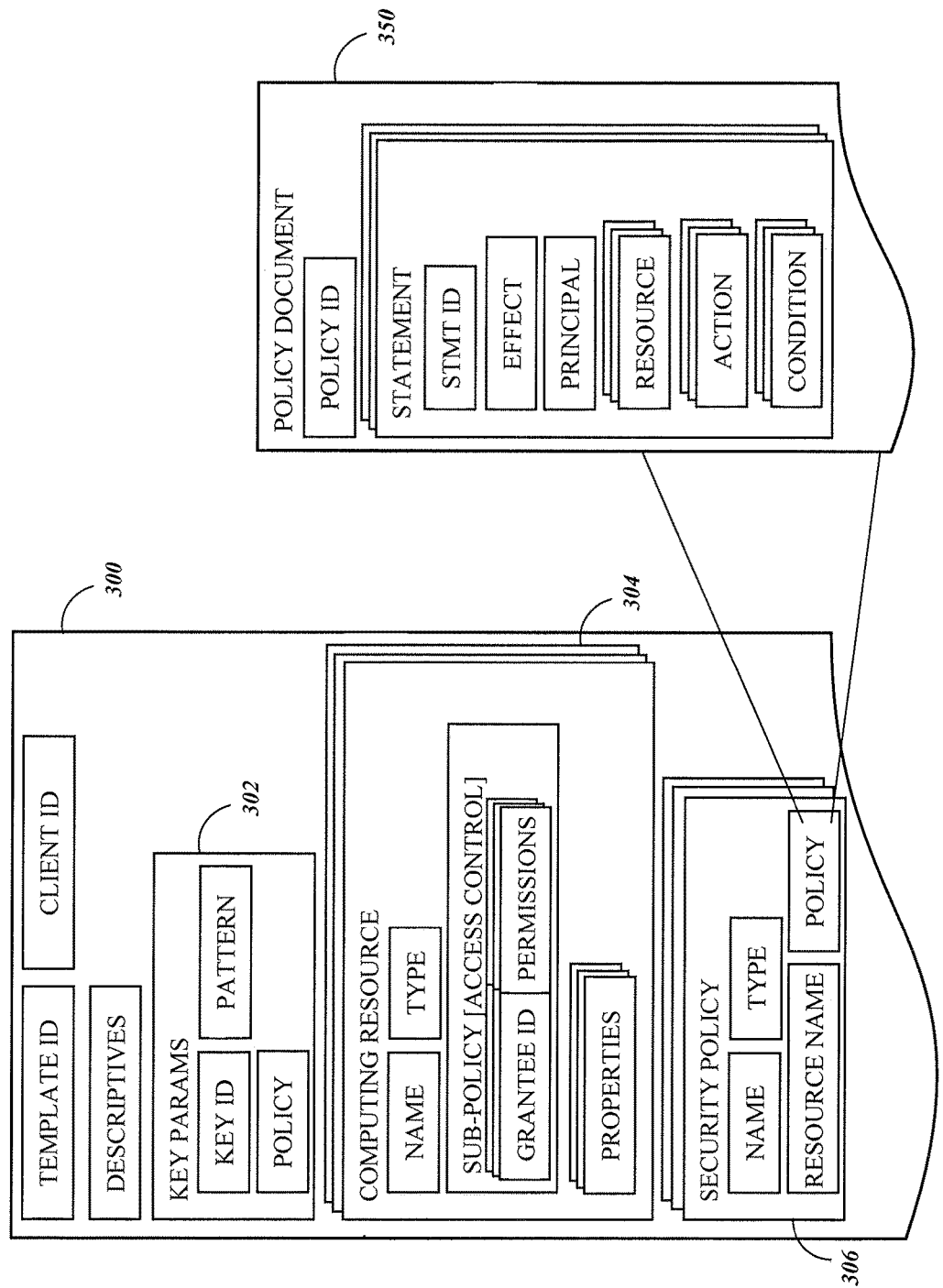
FIG. 3 is a diagram of an example template used to provision and deploy virtual computing resources.

FIG. 3 illustrates an example template 300, which may be an example of the template 114 of FIG. 1. A template may have more or less information than the illustrated template 300; the following description provides some examples of resources that can be defined and launched using a template. A template 300 may include header information such as a template identifier, a user identified for the user (i.e., client) who owns the template, and one or more fields containing descriptive information such as versioning and text describing what the template 300 is used for. One or more definitions 302, 304, 306 may be included in the template, and each may provide parameters to be included in the configuration of resources created and/or launched from the template 300. Non limiting examples of resource definitions include: an encryption key definition 302 including a key identifier, an access policy, and one or more patterns for performing cryptographic functions; a computing resource definition 304 including a name for identifying virtual resource instances launched from the definition 304, a resource type (e.g., virtual machine, data store, message queue, etc.), one or more access control lists or other security sub-policies identifying one or more users and the access permissions they are granted, and one or more properties of the corresponding virtual resource instance; and, a security policy definition 306 including a policy name, policy type, the name of the computing resource the security policy attaches to, and the security policy 350 itself or a reference (e.g., file name) thereto.

A resource allocation system as described above may be configured to create and configure virtual resource instances from the definitions in the template 300. In one example, the resource allocation system may read a computing resource definition 304 for a virtual machine to determine the type and amount of physical and/or virtual resources to allocate for an instance of the virtual machine. This information may be determined from the properties of the definition 304, such as a virtual machine image file or a plurality of parameters identifying the file system, operating system, runtime environment, number and composition of containers, software program(s) to execute, and the like. The properties may also identify how an associated instance should be connected to the virtual network and/or configured as an endpoint connected to an external communication network. In another example, the resource allocation system may read a security policy definition 306 to create a security policy and attach the security policy to the example virtual machine instance.

A security policy may include a policy document 350 that includes a policy identifier and one or more permission statements. In some embodiments, a permission statement may have its own identifier and may specify a principal, a resource, an action, a condition, and an effect. In some embodiments, a permission statement may also specify a plurality of one or more of these elements such as, for example, a set or class of users, a collection of resources, several different actions, and/or multiple conditions. In some embodiments, the permission statement may specify one or more wildcard or otherwise modifiable characters that may be used to denote that the permission statement may be modified to make the permission statement applicable to different users and their associated resources. Wildcards may be represented in various formats—for example, an asterisk may represent any number of characters and a question mark may represent any single character. In some embodiments, the policy may be expressed in a language independent format such as JavaScript Object Notation (JSON). Examples discussed in this disclosure may be in JSON format or in a format similar to JSON and as illustrations of various embodiments which may be implemented. Of course, various other formats which may be utilized in the manner described in connection with JSON and JSON-like formats are also contemplated and within the scope of this disclosure.

The principal may be a user, a group, an organization, a role, or a collection and/or combination of these or other such entities. A principal may be any entity that is capable of submitting API calls that cause an action associated with a resource to be performed and/or any entity to which permissions associated with a resource may be granted. As an example, a permission statement may have a principal element specified in the following manner:

"Principal": "rn:ws:iam::clientusername"

In some embodiments, the principal is identified by a resource name that uniquely identifies the principal. A principal may include one or more name spaces that include additional information regarding the principal. For example, "rn" may refer to a resource name prefix and identifies the subsequent information as part of a resource name; "ws" may refer to a partition namespace that the resource is in; "iam" may refer to a service namespace that identifies a service of a computing resource service provider (e.g., the computing resource service provider may provide services related to identity and access management); namespaces may additionally be omitted (note that there are two semi-colons in the example above between "iam" and "clientusername")—in some formats and/or for some resources, a region namespace may be option; and "clientusername" may refer to an identifier for the account, such as the account that owns the resource specified in the permission statement.

The resource may refer to a computing resource of a computing resource service provider. Computing resources of a computing resource service provider may include: compute resources (e.g., virtual machine instances); storage resources (e.g., scalable storage, block storage, and managed file storage systems); database systems (e.g., managed relational database systems); migration services (e.g., applications, services, and hardware for streamlining the transfer of data from one physical data center to another); network and content delivery; developer tools; management tools; security, identity, and access management services; analytics services; artificial intelligence services; and more. Computing resources may be organized in a hierarchy, and may use structures such as folders, directories, buckets, etc. to organize sets of computing resources into groupings. In some cases, policies and/or permissions may be applied directly to a bucket and grant cross-account access to an environment.

As an example, a permission statement may have a resource element specified in the following manner:

"Resource": "rn:ws:storage:::bucket/tastyfood.png"

In some embodiments, the resource is identified by a resource name that uniquely identifies the resource. In some cases, the resource may share a same naming convention as the principal or other elements of the permission. However, this need not be the case, as each separate element of a permission statement may use a naming convention, namespace, format, etc. that is independent of other elements. In the example resource given above, "rn" may refer to a resource name prefix and identifies the subsequent information as part of a resource name; "ws" may refer to a partition namespace that the resource is in; "storage" my refer to a service namespace that identifies a service of a computing resource service provider (e.g., the computing resource service provider may provide services related to object-based storage); as discussed elsewhere, namespaces may be omitted in some cases—for example, a region namespace and/or account namespace may be omitted; and a resource which may also include an indicator of the type of resource. In the example above, the resource may indicate an image in the Portable Network Graphics (PNG) format and is stored in a bucket.

The action may be the specific action or actions that will be allowed or denied by the permission. Different types of services (e.g., having different service namespaces) may support different actions. For example, an identity and account management service may support an action for changing passwords, and a storage service may support an action for deleting objects. An action may be performed in association with the resource and may, for example, be identified by a type of API call, a library call, a program, process, series of steps, a workflow, or some other such action. As an example, a permission may have an action element specified in the following manner:

"Action": "storage:GetObject"

In this example, the action that is allowed or denied (determined based on the effect specified in the permission) corresponds to a storage service that supports an action (e.g., API call) for GetObject, which may be used in connection with obtaining an object and/or access to an object of a storage service. As discussed elsewhere, various namespaces may be used in connection with specifying an action. Wildcards may be used to specify multiple actions. For example, an action element described as "Action": "storage:*" may refer to all APIs supported by a storage service. As a second example, an action element described as "Action": "iam:*AccessKey*" may refer to actions supported by an identity and access management service in connection with access keys of a service—illustrative examples may include actions related to creating an access key (e.g., a "CreateAccessKey" action may exist), deleting an access key (e.g., "DeleteAccessKey"), listing access keys (e.g., "ListAccessKeys"), and updating an existing access key (e.g., "UpdateAccessKey").

The condition element may be one or more conditions that specify when a policy is in effect. In some embodiments, the condition element is optional and may be omitted in some permissions. Conditions may be described as Boolean expressions that may be used to determine whether the policy is in effect (i.e., if the expression evaluates to TRUE) or not in effect (i.e., if the expression evaluates to FALSE). Policies that are not in effect may be unenforced or ignored by an authorization module (such as those described elsewhere in this). In some embodiments, conditions in a permission may be evaluated against values provided as part of a web API request corresponding to one or more APIs specified in the action element. As an example, a permission may have a condition element specified in the following manner:

"Condition": {"DateLessThan": {"ws:CurrentTime": "2017-12-13"}}

In this example, the condition, the "ws:CurrentTime" value of the request is compared against a literal value "2017-12-13" using the condition operator "DateLessThan" which may be used to evaluate whether the condition is met. In this example, the condition may be true when the current time (e.g., the time the request is received by the service provider) is less than the supplied date of Dec. 13, 2017. It should be noted that the key value (in the example, the current time) may be compared not only against literal values, but policy variables as well. Various other types of condition operators may exist, which may be used for comparing string conditions, numeric conditions, Boolean conditions, binary conditions (e.g., testing values in binary format), IP address conditions (e.g., testing values against a specific IP address or range of IP addresses), and more. Conditions may, furthermore, include quantifiers. For example, a string condition may include an operator such as "StringEquals" that compares whether two strings are equal, and a similar operator may include a quantifier such that "StringEqualsIfExists" may be used to compare two strings when the key value exists in the context of an evaluation. Quantifiers may be used in conjunction with wildcards where multiple resources matching a wildcard expression may support different context keys. In some embodiments, such as those where conditions include quantifier, first-order logic may be utilized rather than propositional logic.

An effect may refer to whether the permission is used to grant or deny access to the computing resources specified in the permission in the resource element. An effect may be an ALLOW effect, which grants access to a resource, and a DENY effect, which denies access to a resource. In some embodiments, access to computing resources of a computing resource service provider are denied by default and a permission affirmatively including an ALLOW effect is required. As an example, a permission may have an effect element specified in the following manner:

"Effect": "ALLOW"

Accordingly, a permission statement that grants a particular principal (e.g., "rn:ws:iam::ducksfan8") access to call a storage service API (e.g., "storage:GetObject") and obtain a particular image (e.g., "rn:ws:storage:::bucket/tastyfood.png") when a specific condition is true (e.g., the API request is made prior to Dec. 13, 2017) may be specified in the following manner:

```
"Statement": [
  {
    "Effect": "ALLOW",
    "Principal": "rn:ws:iam::clientusername",
    "Action": "storage:GetObject",
    "Resource": "rn:ws:storage:::bucket/tastyfood.png",
    "Condition": {
      "DateLessThan": {
        "ws:CurrentTime": "2017-12-13"
      }
    }
  }
]
```

It should be noted that the examples described above merely described one of many ways in which permissions may be expressed. Of course, in other embodiments, variations on the principles described above in connection with FIG. 3 may be applied in various ways.

In some embodiments, elements may be described in inverse (e.g., negative) terms. An inverse element may be applied to all matches except for those specified in the element. For example, if a permission statement is described as "NotPrincipal: clientusername" then the permission statement applies to all principals except the particular principal or principals listed in the permission statement—in this case, the permission statement would apply to all principals except clientusername. An inverse element may be used in conjunction with the principal element (e.g., a "NotPrincipal" element would apply to all principals except those listed), the action element (e.g., a "NotAction" element would apply to all actions except those listed), the resource element (e.g., a "NotResource" element would apply to all resources except those listed), and so on.

A permission statement may be used to generate a propositional logic expression that can be evaluated by a security assessment system. A propositional logical expression may comprise a set of logical expressions which represent the permission statement. Propositional logical expressions may be evaluated to determine whether a formula is satisfiable. For example, propositional logic may be used to determine whether it is satisfiable that a resource is allowed under a first propositional logical expression corresponding to a first security policy comprising a first set of permissions and the resource is not allowed (e.g., explicitly denied and/or not explicitly granted an ALLOW effect) under a second propositional logical expression corresponding to a second security policy comprising a second set of permissions. In some embodiments, the permission statement may be used to generate a propositional logic expression. The principal element may map to a principal propositional logic expression which may comprise of statements in propositional logic and one or more assertions that are used as constraints on whether a formula is satisfiable. Likewise, the resource element may map to a resource propositional logic expression, the action element may map to an action propositional logic expression, the condition element may map to a condition propositional logic expression, and the effect element may map to an effect propositional logic expression.

Figure 4A:
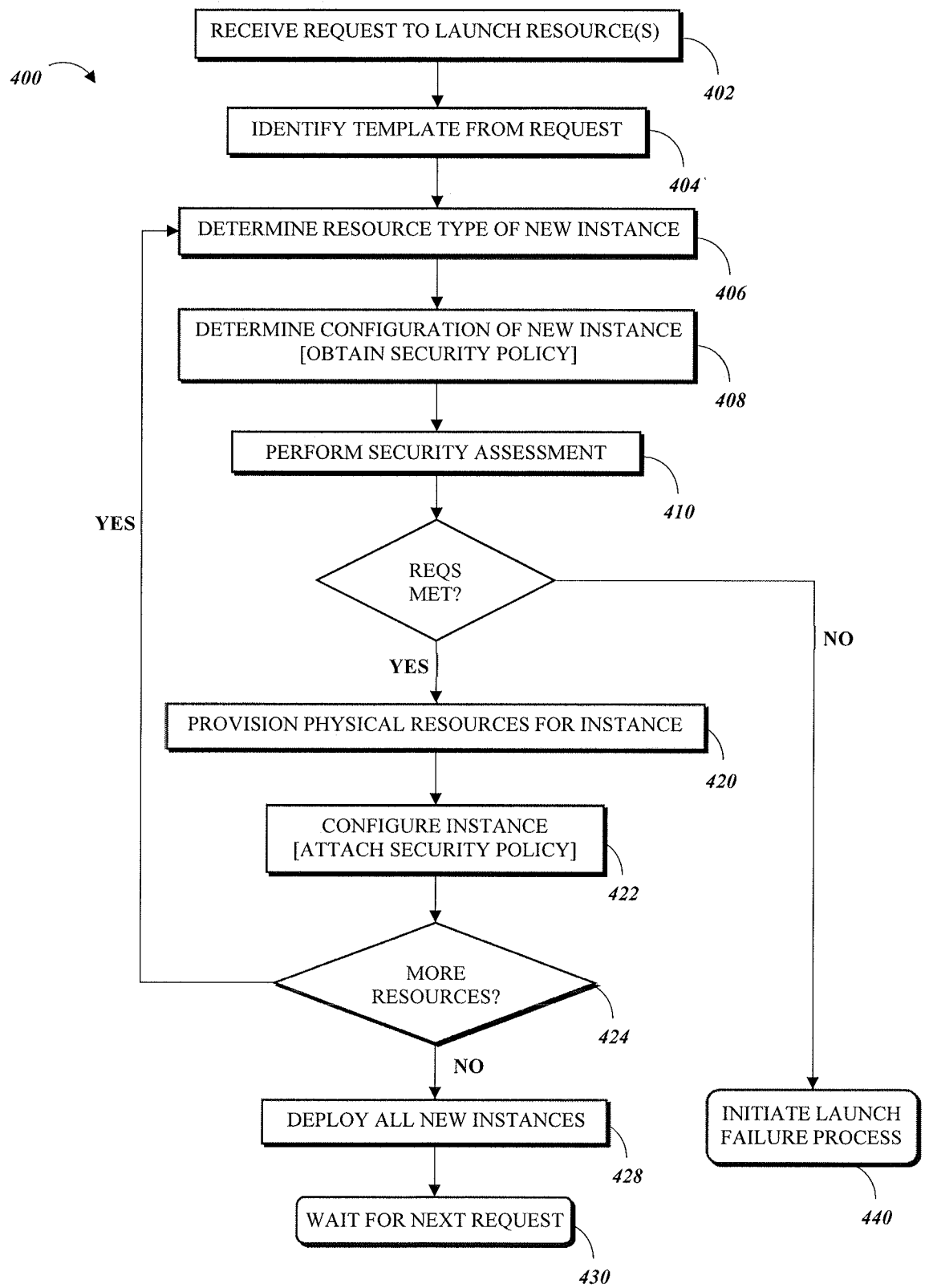
FIG. 4A is a flowchart of an example method of pre-deployment security analysis of virtual computing resources in accordance with the present disclosure.

FIG. 4A illustrates an example method 400 that the system(s) of FIGS. 2A-D, for example, may perform to validate requested virtual resources and their configurations against a predetermined set of security checks, as described above. At step 402, the system may receive a request to launch and/or access virtual computing resources. For example, the system may receive launch commands from the user associated with the virtual resources, such as via an administrator API, or the system may receive a request from an end user connected to the system via an end user API, or another event occurring in the system may trigger the request. The request may include information that allows the system to, at step 404, identify a template containing definitions for the requested resources. For example, the request may include a stack identifier that the system may use to access a template database and obtain the template associated with the stack identifier.

At step 406, the system may select a first computing resource definition from the template and determine the associated resource type, which may be one of the fields of the resource definition. At step 408, the system may determine and/or create a configuration for a new virtual resource instance, based at least in part on the properties identified in the computing resource definition. Additionally, the system may obtain and/or create a security policy to be attached to the virtual resource instance. For example, the system may use the resource name of the computing resource definition to identify a security policy referencing the resource name. In another example, the system may use the resource type to identify the security policy. In yet another example, the security policy, or a reference thereto, may be included in the computing resource definition.

At step 410, the system may perform the security assessment, which identifies any parameter or other aspect of the proposed configuration and security policy of the virtual resource instance that violates a predetermined security requirement. If all of the security requirements are met (e.g., security checks are passed), the system can continue the deployment process by proceeding to step 420. If not all security requirements are met, at step 440 the system may initiate a failure process in which the virtual resource(s) of the request is/are denied deployment.

In some embodiments, to perform the security assessment (step 410) the system may evaluate one or more comparisons of configuration parameters derived from the template and/or the request (as determined at step 408) to aspects of the security model described above. Non-limited examples of parameters that may be tested include: properties having default values set by the computing resource definition in the template; properties defined in the template and having variable values that are determined from data in the request, one or more user accounts, historical usage data stores, other virtual resource instances presently executing in the associated virtual computing environment, data sources external to the system, and/or other data stores; parameters of the user account of a requesting end user; and, parameters of the security policy. Additionally or alternatively, the system may evaluate data collected by performing static or dynamic analysis of various stored data and/or telemetry data generated by executing virtual resource instances. The system may include one or more services that analyze this data, such as the services described below with respect to FIG. 7. The reference values against which the collected configuration parameters and other data are compared may be specified by security checks included in the template and/or the request; these reference values may be stored in the security model and/or the model security policies described above. Various examples of the security checks, the data evaluated by the checks, and the methods in which the data are evaluated are described throughout the disclosure.

At step 420, after determining that the proposed configuration and security policy are valid, the system may provision physical and/or virtual computing resources and create the virtual resource instance therein. For example, to provision a virtual machine instance, the system may identify one or more hardware computing devices (e.g., servers 202 of FIG. 2C) having sufficient available processing, memory, and data storage resources. The system may allocate these physical resources by creating logical partitions and installing a virtual machine image, or an operating system, a file system, device drivers, and software applications, in the appropriate partitions. At step 422, the system may configure the provisioned instance using the proposed configuration determined/created at step 408. This step may include attaching the security policy to the virtual resource instance, such that access to the virtual resource instance is controlled by the security policy permission statements. At step 424, the system may determine whether any more virtual resource instances must be created from the template/request. If so, the system returns to step 406; if not, the system may deploy all newly provisioned instances (step 428) into the execution environment associated with the client user, and then wait for the next request (step 430).

Figure 4B:
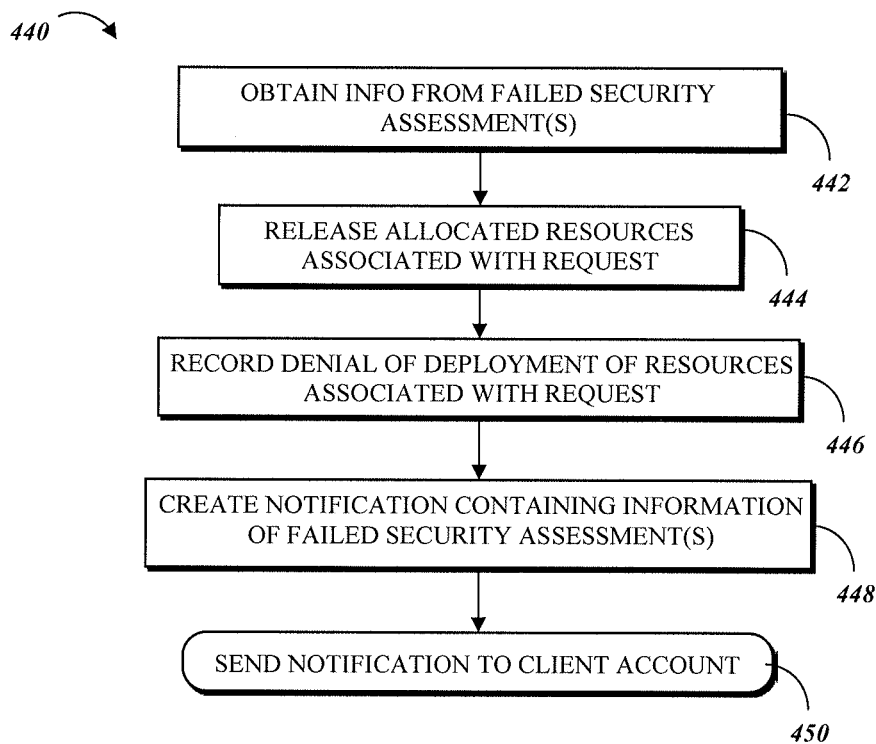
FIG. 4B is a flowchart an example method of processing an instance launch failure in connection with the method of FIG. 4A.

FIG. 4B illustrates an example method 440 of processing a security check failure in the presently described systems. At step 442, the system may obtain information describing the failed security check. For example, where the security check was to ensure that a data storage instance is not world-writeable, and the system compared the proposed security policy to a model data storage security policy and determined that the proposed security policy would render the data storage instance world-writeable (thus failing the check and initiating the method 440), the system may receive (e.g., generate) information describing such security check failure, including an identification of the proposed security policy and a description of the problem. At step 444, the system may release any physical and/or virtual computing resources that have been allocated and are associated with the request. For example, where there are multiple virtual resource instances identified in the request, and one or more of the virtual resource instances has already passed the security checks, some resources may be associated with such a virtual resource instance or with its associated security policy. In another example (in accordance with the example system described below), the virtual resource instance that fails the security check, or that is associated with the security policy that fails the security check, may already be provisioned to the extent necessary to resolve a configuration or policy sufficiently to perform the check; once the check is performed and fails, the associated instance will not deploy. The system may identify any provisioned and/or deployed instances associated with the request, terminate such instances, and remove or destroy any data links to the request, such that the resources are returned to an available resource pool.

At step 446, the system may store information related to the denial of resource deployment, such as the information obtained at step 442, in a usage data store in order to aggregate information about failed launches. At step 448, the system may create a notification containing any of the information obtained regarding the failure of the configuration and/or security policy to pass the security checks, and at step 450 the system may deliver the notification to the client user, such as by storing the notification in a usage log or sending an email, push notification, or other alert containing the notification to a client user device. Subsequently, the client user may access the system (e.g., via the administrator user interface) and correct the errors reported in the notification.

Figure 5A:
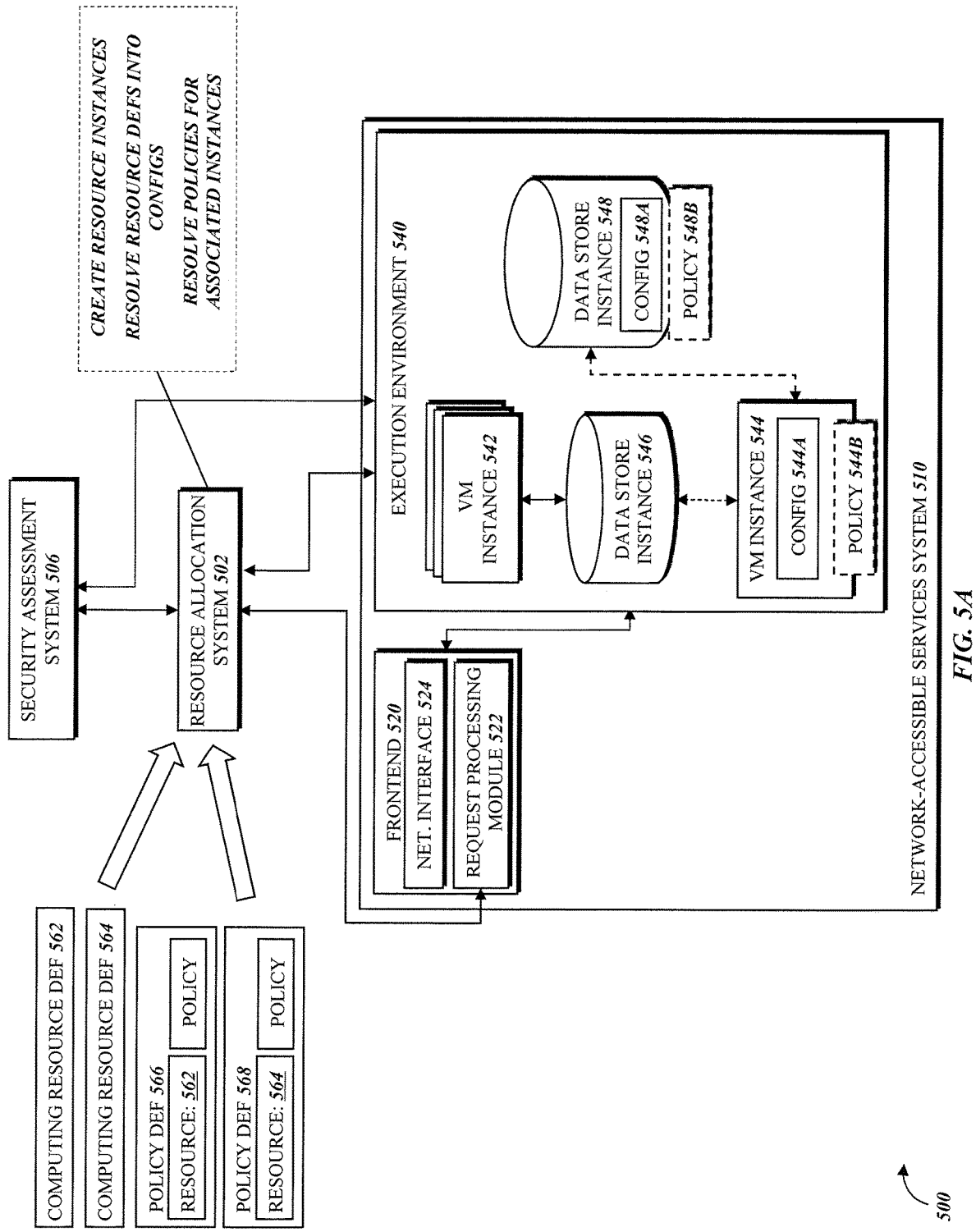
FIGS. 5A-B illustrate another example computing environment implementing a progression of another example method of checking virtual computing resource instances for security vulnerabilities before they are deployed, in accordance with the present disclosure.
Figure 5B:
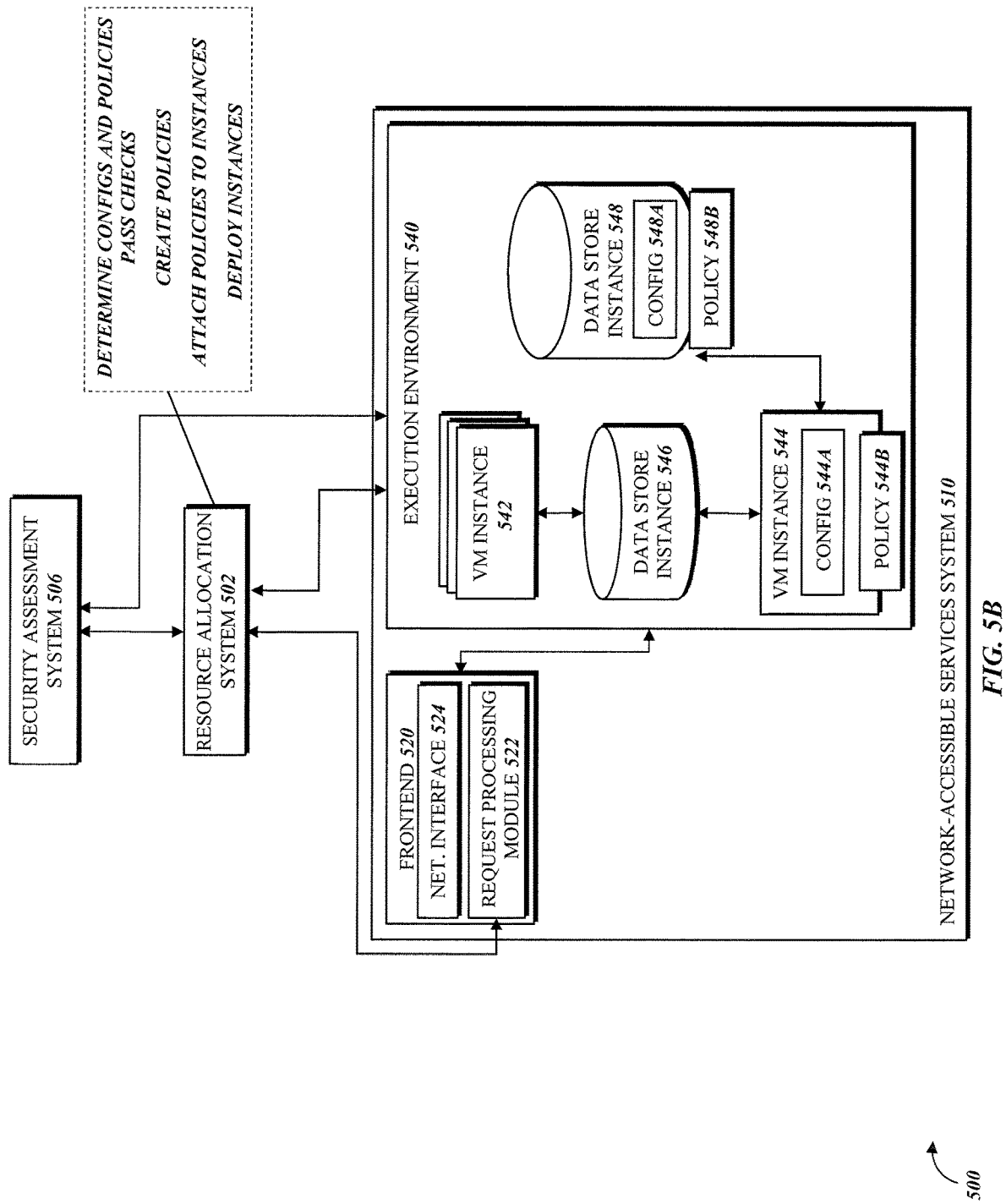

FIGS. 5A-B illustrate another example distributed computing environment 500 in which the present systems and methods may be implemented. A security assessment system 506 may operate as described above with respect to the security assessment system 206 of FIGS. 2A-D. A resource allocation system 502 and a network-accessible services system 510 may cooperate substantially as described above with respect to FIGS. 2A-D, and may further be configured to prepare requested virtual resource instances for the security checks when the corresponding computing resource definitions 562, 564 and/or security policy definitions 566, 568 include unresolved references and/or variables that are required by the security checks but cannot be tested until the references/variables are resolved—which typically does not occur until the corresponding virtual resource instances are provisioned and/or deployed into an execution environment 540 of the network-accessible services system 510.

In order to perform the pre-deployment security checks, the resource allocation system 502 may create requested instances in a manner that allows unresolved references and/or variables in the associated resource definitions to be resolved, so that security checks against the instance configurations and/or security policies may be performed. In one embodiment, creating the requested instances in this manner may include allocating physical resource for the virtual resource instances, provisioning the virtual resource instances with the attendant resolved configurations. FIGS. 5A-B illustrate an example of this embodiment. To wit, the resource allocation system 502 determines that a request is received for virtual resources represented by computing resource definitions 562, 564 (e.g., stored in one or more templates as described above). The resource allocation system 502 creates a virtual machine instance 544 from a first computing resource definition 562, and a data store instance 548 from a second computing resource definition 564, within the execution environment 540. Placing the instances 544, 548 in the execution environment 540 allows the resource allocation system 502 to resolve any unresolved references and/or variables of the associated definitions 562, 564 in the context of the network accessible services system's 510 deployed virtual resource instances (e.g., virtual machine instance 542 and data store instance 546), virtual network connections, and other components such as routers, load balancers, logical volumes, and the like. However, the resource allocation system 502 may not create any usable connections between the instances 544, 548 and any of the deployed components—that is, the instances 544, 548 may be provisioned into the execution environment 540, but they are not deployed or otherwise discoverable by any other resource.

The resource allocation system 502 may create a configuration 544A, 548A for the respective instance 544, 548 based on the properties of the corresponding computing resource definition 562, 564; the configuration 544A, 548A may further be based on contextual parameters of the execution environment 540. In some embodiments, an instance 544 may have a complete configuration 544A and all other resources allocated to it, as if the instance 544 were going to be deployed into the execution environment 540. In other embodiments, the instance 544 may be allocated just enough resources, and the configuration 544A may contain only the essential parameters, to enable the resource allocation system 502 to resolve the unresolved references and/or variables. For example, the computing resource definition 562 may be a virtual machine type and may include one or more references that enable a corresponding virtual machine instance to access any data store instances generated from the computing resource definition 564; an executing data store instance 546 of FIG. 5A is one such data store instance. The resource allocation system 502 may generate the virtual machine instance 544 with a virtual machine resource type and a configuration 544A that includes resolved references identifying the data store instance 546 and a new data store instance 548 also being provisioned from the same request.

The resource allocation system 502 may send the resolved references and other configuration parameters to the security assessment system 506 as described below. Additionally, the resource allocation system 502 may resolve any resolvable parameters of security policy definitions 566, 568 that correspond to the computing resource definitions 562, 564 using the provisioned instances 544, 548, and may send resolved policies to the security assessment system 506 for the security checks. It should be noted that the dotted lines of FIG. 5A indicate an example embodiment wherein the resource allocation system 502 has resolved the definitional references for, but has not created, the connections between the requested virtual machine instance 544 and the data store instances 546, 548, and the security policies 544B, 548B for the requested instances 544, 548.

As shown in FIG. 5B, if the resource allocation system 502 receives an indication from the security assessment system 506 that the configurations 544A, 548A and security policies 544B, 548B all passed the security checks, the resource allocation system 502 may create the security policies 544B, 548B and attach them to their respective resources (thus, the security policies 544B, 548B are shown in solid lines). The resource allocation system 502 may then deploy the virtual resource instances 544, 548 into the execution environment 540 with the respective configurations 544A, 548A and security policies 544B, 548B attached. Deploying the virtual resource instances 544, 548 may include at least creating the virtual network connections between the virtual machine instance 544 and the data store instances 546, 548, and may further include, for example, connecting the virtual machine instance 544 to an external communication network (e.g., the internet) directly or through the frontend 520.

Figure 6:
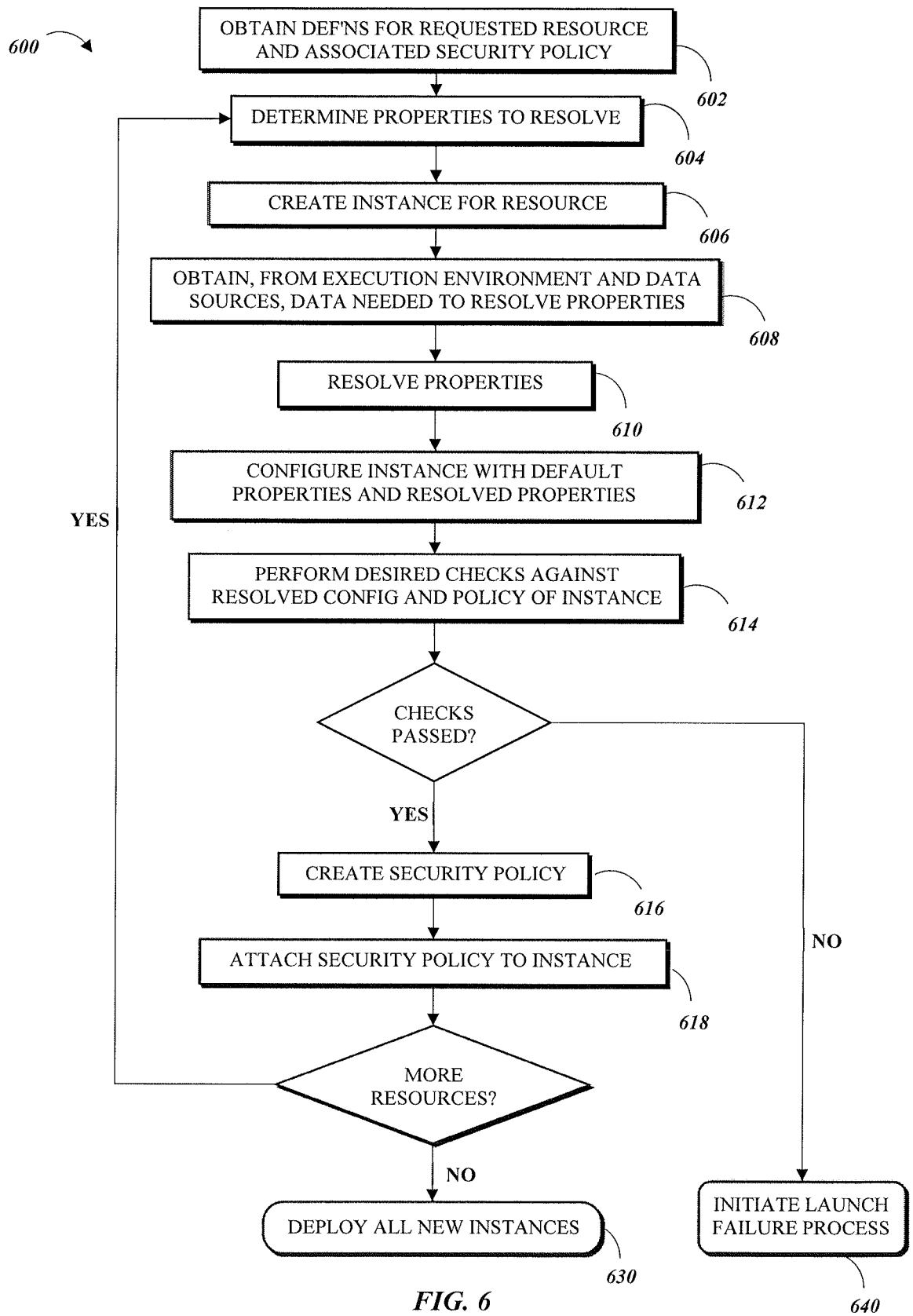
FIG. 6 is a flowchart of another example method of pre-deployment security analysis of virtual computing resources in accordance with the present disclosure.

Referring to FIG. 6, an example method 600 may be performed by the system, in the computing environment 500 of FIGS. 5A-B, for example, to process a request for virtual computing resources. At step 602 the system may obtain the computing resource and security policy definitions needed to provision the requested virtual resources. For example, the system may obtain the definitions from a template identified in the request, as described above. At step 604, the system may determine which properties in the definitions, including any properties that do not have default (i.e., resolved) values, are needed to perform a desired set of security checks (e.g., as identified in the template). For example, a virtual machine instance definition may include a line of code indicating that the instance connects to a data store instance with an unresolved identifier; the system may determine that the identifier must be resolved—that is, the "connected" data store instance must be identified—in order to execute a desired check.

At step 606, the system may create a first of the virtual resource instances associated with the request. In an example of creating a virtual machine instance, the system may allocate basic resources such as a processor, memory, logical storage volume, and virtual network interface, but may not provision any operating system, software, etc., that is not needed to test a network connection or other configuration of the virtual machine interface. In another example, the system may allocate all physical resources and associated software identified in the resource definition of the virtual machine instance. The system may provision the virtual resource instance into the execution environment as described above. At step 608, the system may obtain all of the information needed to resolve any properties of the virtual resource instance that are unresolved in the computing resource definition or the associated security policy definition, and at step 610 the system may resolve the unresolved properties (e.g., to static values). For example, from the previous paragraph, where the identifier of a data store instance to which the virtual machine instance connects is a variable in the computing resource definition, the system may determine that the identifier is provided by the client either upon execution of a resource request (e.g., via arguments of a command) or in advance of a request (e.g., as a parameter value stored in a check record of the security model). To resolve the property, the system retrieves the identifier.

At step 612, the system may configure the virtual resource instance with the default properties and the resolved properties (from step 610). For example, the system may set configuration parameters to enable the instance to communicate through a network interface as proscribed in the resource definition. This enables performance of, for example, a security check against a security policy to determine whether the policy ensures no unused ports of the virtual machine instance's network interface are open. At step 614, the system may perform the security checks on the configured virtual resource instance and its resolved security policy, to determine if the security checks are passed (go to step 616) or failed, and the system must initiate the launch failure process (step 640, described above).

If the virtual resource instance passes the designated security checks, at step 616 the system may create the corresponding security policy and attach the policy to the virtual resource instance. For example, the system may convert the security policy definition into a security policy, based on the resolved security policy that passed the security checks; the system may add the security policy to the metadata of the virtual resource instance. In contrast, if the configuration or the security policy do not pass the security checks, the system may deny creation of the security policy. If there are more instances to create from the request, the system may return to step 604 and repeat the method 600 for the next instance. At step 630, the system may deploy the new instances into the execution environment.

Figure 7:
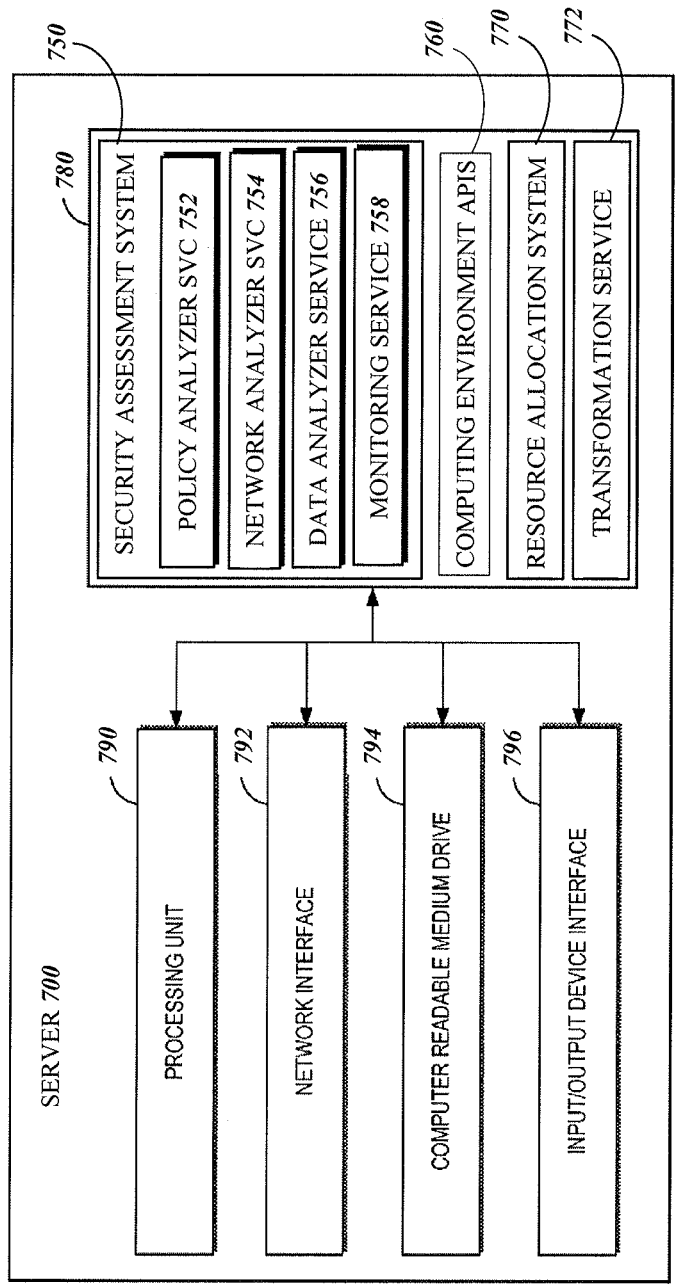
FIG. 7 is a diagram of a hardware computing device implementing the systems and methods of the present disclosure.

FIG. 7 depicts a general architecture of a computing system (referenced as server 700) that processes requests to allocate virtual computing resources to a user in a computing environment as described above. The general architecture of the server 700 includes an arrangement of computer hardware and software modules that may be used to implement aspects of the present disclosure. The hardware modules may be implemented with physical electronic devices, as discussed in greater detail below. The server 700 may include many more (or fewer) elements than those shown in FIG. 7. It is not necessary, however, that all of these generally conventional elements be shown in order to provide an enabling disclosure. Additionally, the general architecture illustrated in FIG. 7 may be used to implement one or more of the other components illustrated in the preceding Figures, including the resource allocation system, the security assessment system, and the network-accessible services system, each of which may be implemented in the same or a separate architecture from the others.

As illustrated, the server 700 includes a processing unit 790, a network interface 792, a computer readable medium drive 794, an input/output device interface 796, all of which may communicate with one another by way of a communication bus. The network interface 792 may provide connectivity to one or more networks or computing systems. The processing unit 790 may thus receive information and instructions from other computing systems or services via a communication network. The processing unit 790 may also communicate to and from memory 780 and further provide output information for an optional display (not shown) via the input/output device interface 796. The input/output device interface 796 may also accept input from an optional input device (not shown).

The memory 780 may contain computer program instructions (grouped as modules in some embodiments) that the processing unit 790 executes in order to implement one or more aspects of the present disclosure. The memory 780 generally includes RAM, ROM and/or other persistent, auxiliary or non-transitory computer-readable media. The memory 780 may include computer program instructions and other information for implementing aspects of the present disclosure. For example, in one embodiment, the memory 780 implements a security assessment system 750, a resource allocation system 770, and a transformation service 772, as described above. The server 700 may include a computing environment API 760 that may be executed by the processing unit 790 to enable the security assessment system 750 to access and otherwise communicate with the network-accessible services systems described above). In addition, the memory 780 may include and/or communicate with one or more data repositories (not shown), for example, to access usage data, user data, a security model, security policies, and the like.

The security assessment system 750 may include several services implemented in hardware, software, or a combination thereof, and communicating with various other services and with physical (e.g., hard drives) or virtual resources (e.g. logical drives) to obtain and analyze data according to the security check or other security assessment being performed. In some embodiments, a different service 752-758 may analyze each different type of data needed to perform the security checks, although in other embodiments services may be consolidated, or unused if the corresponding type of data is not collected or analyzed. A client may authorize the services to access virtual resources associated with the client's user account, so that the services can obtain private and/or remote data.

In various examples, a policy analyzer service 752 may analyze security policies to determine the relative permissiveness of the policies—in other words, the policy analyzer service 752 may be used to determine whether two security policies are equivalent, whether a first security policy is more permissive than a second security policy, and more. In this context, permissiveness is used to describe access to resources. For example, if a first policy can be utilized to access to a first computing resource (e.g., resource "A") and a second resource (e.g., resource "B") and a second policy grants access only to computing resource "B," then the first policy may be described as being more permissive than the second policy because there exists a computing resource which the first policy grants access to which the second policy does not grant access to and there does not exist a resource that the second policy grants access to which the first policy does not grant access to. Two policies may be equivalent if they both can be utilized to access to the same resources and deny (either implicitly or explicitly) access to the same resources. Generally, speaking, if two policies are not equivalent, they may be said to lack equivalency. In some cases, if a first policy grants access to a first computing resource "A" and a second computing resource "B" and a second policy grants access to the second computing resource "B" and a third computing resource "C" the polices may be said to be incomparable. It should furthermore be noted that in the context of these discussions, security policies may be utilized to grant or deny access to resources in the context of a computing resource service provider where a request to access resources may be evaluated by an authorization module or authorization service by utilizing a security policy applicable to the request. An applicable security policy may be a security policy associated with the requestor, a security policy associated with a token that the requestor presents, and more.

In one embodiment, a policy analyzer service 752 may accept, as input, two or more security policies and determine whether they are equivalent, whether one policy is more permissive than another policy, whether the policies are incomparable, and so on. In another embodiment, the policy analyzer service 752 may accept a single security policy and compare the security policy against one or more stored security policies, such as best practices policies (as described above) or an associated user's other security policies. As explained above, one embodiment of best practices policies may be a set of security policies that are determined to be a set of permissions which are should not be allowed. For example, a first best practices policy may be that a particular data container should not be world-writeable (i.e., any principal, even a guest user or anonymous user can write to the container). The policy analyzer service 752 may verify that best practices policies are being followed by determining that the received policy is not more permissive than each of the best practices policies. Examples of best practices policies may include resources being world writeable, world readable, world accessible, and the like. In some embodiments, a collection of best practices policies may be determined based on the type of computing resource requested, information in the request for resources, and other context information.

A policy analyzer service 752 may receive a security policy and obtain one or more permission statements from the policy. The permission statements may each be associated with the granting or denying access to computing resource. The policy analyzer service 752 may convert permission statements into one or more constraints described using propositional logic. The constraints may be described in various formats and in accordance with various standards such as SMT-LIB standard formats, CVC language, and Center for Discrete Mathematics and Theoretical Computer Science (DIMACS) formats. The propositional logic expressions may represent a set of constraints that must be satisfied for the corresponding permission statement to be in effect.

The policy analyzer service 752 may compare the first propositional logic expression and the second propositional logic expression to determine whether one propositional logic is more permissive than the other, and/or to otherwise analyze the permissiveness of two or more propositional logic expressions. The policy analyzer service 752 may generate additional propositional logic constraints as part of determining whether the first propositional logic expression is more permissive than the second propositional logic expression. The constraints may be generated and evaluated in addition to constraints of the first propositional logic expression and the second propositional logic expression. The constraints may be generated based at least in part on client-provided settings. For example, the policy analyzer service 752 may generate constraints that are satisfied only under circumstances where a first policy grants access to a resource and a second policy denies access to the resource or is neutral regarding the resource. In some embodiments, a command may be used to determine whether the set of constraints are satisfiable. A formula may be satisfiable if there is an interpretation that makes all the asserted formulas true. In other words, the model is satisfiable if each of the constraints is satisfied under some conditions. In one example, the policy analyzer service 752 may interpret the formulas at least in part using a SMT solver such as Z3.

A network analyzer service 754 of the security assessment system 750 can obtain and analyze data describing network communications associated with, affecting, or potentially affecting requested resources, in order to perform at least a part of one or more of the security checks. In this context, the network analyzer service 754 may detect some of the same vulnerabilities as the policy analyzer service 752 detects by analyzing the applicable security policy/ies, as well as additional vulnerabilities. For example, while the policy analyzer service 752 may determine whether a security policy leaves open the TCP communication port 23, the network analyzer service 754 may attempt to send packets or other messages to the associated instance or to an associated virtual network interface via port 23 and record whether the messages are received by the instance.

Generally, the network analyzer service 754 may be configured to perform any suitable analysis of the virtual network(s) and interfaces to external networks in the client's virtual computing environment. For example, the network analyzer service 754 may test for any CVEs or other vulnerabilities identified by security best practices. In another example, the network analyzer service 754 may test the security of the requested resources by performing or simulating any common, reproducible active or passive attack and comparing the results to stored thresholds that represent pass or fail conditions. Non-limiting examples of such attacks include: idle scan or another port scan; wiretapping; overflow attack such as denial-of-service, buffer overflow, or heap overflow; spoofing attacks such as man-in-the-middle and DNS spoofing; SQL injection; and the like. The network analyzer service 754 may, in other embodiments, simulate other known types of malicious activity. In another example, the network analyzer service 754 may test whether data of the instance is stored or transmitted without encryption, such as by accessible the data and determining whether the data is readable (e.g., contains English words, or numbers in a known sensitive format such as credit card number format or social security number format). In another example, the network analyzer service 754 may perform semantic analysis of network traffic logs, subnet or virtual private network configurations, and the like. In another example, the network analyzer service 754 may obtain a network "snapshot" comprising point-in-time networking status information, which may include, without limitation: information about active connections to end user devices, such as device IP address, MAC address, user agent information, volume of data transferred, and the like; and information about network connections of executing virtual resource instances, such as instance IP address, subnet, number and/or identification of connected end users, traffic volume, and the like. In one embodiment, such a snapshot may be obtained of a virtual resource instance that is executing—that is, the instance has been provisioned and deployed and is executing in the virtual computing environment. Additionally or alternatively, the snapshot may be generated before or during provisioning or deployment of the instance. For example, the network analyzer service 754 may generate a snapshot from a template that is used (as described above) to launch the instance; all of the information needed to create the snapshot may be contained in the template's resource definition(s). The network analyzer service 754 may analyze the information from the snapshot to determine whether it reflects compliance with the desired security checks, as described above.

A data analyzer service 756 of the security assessment system 750 can obtain and analyze stored data associated with the request and launch of resources in the virtual computing system. In some embodiments, a virtual resource instance may be launched from one or more stored files, such as a virtual machine image or a file repository (e.g., a ZIP or other compressed file archive). The stored files may include, or define, the configuration of the corresponding virtual resource instance, and may in some cases be specified by a template as described above. The data analyzer service 756 may locate and retrieve the stored files, and execute the desired security checks against them. In some embodiments, a virtual resource instance may be launched by executing one or more software programs. Additionally or alternatively, the virtual resource instance may itself execute one or more software programs, such as a web application. The data analyzer service 756 may analyze the source code and/or object code of such software programs in accordance with the security checks. For example, the data analyzer service 756 may use one or more static analysis methods to identify security vulnerabilities created by the source code or object code. In another example, the data analyzer service 756 may cause one or more hardware computing devices to execute the corresponding software program(s), and may perform dynamic analysis of the executing program.

In other embodiments, the data analyzer service 756 may, as part of a security check, determine whether the requested resource interacts with sensitive data, such as personal identifying information, financial transaction information, and the like; the data analyzer service 756 may evaluate whether the virtual resource instance to be provisioned is properly configured to protect such information. For example, the may use machine learning, natural language processing, pattern matching, logical expression processing, and other data classification technologies to parse event logs and identify personal information such as identifying information, health information, financial information, security keys, etc. The data analyzer service 756 may then determine whether the identified data is properly protected. For example, the data analyzer service 756 may determine whether the information is encrypted at rest and in transit, and whether the information is stored in a secure data store with restricted authorized access. The data analyzer service 756 may compare the evaluated security measures to thresholds associated with the security check and/or best practices, and may report pass/fail results to the security assessment system 750 or another system component.

A monitoring service 758 of the security assessment system 750 can perform real-time, on-demand or scheduled data collection methods on virtual resource instances that have been deployed in the client's virtual computing environment. In some embodiments, the monitoring service 758 may respond to triggering events by collecting data associated with an instance's configuration, security policy, network activity, and stored data as described above. For example, a client user may change configuration parameters of an executing instance or of a template that is used to launch virtual resource instances; when the change is stored, the system may generate a notification that is received by the monitoring service 758, and the monitoring service may identify any affected virtual resource instances and collect the configuration, security policy, and other data needed to perform the desired security checks. The monitoring service 758 may then send the collected information to the other services of the security assessment system 750 as needed, or may store the information and send messages to the corresponding services indicating that the collected information is available. Alternatively, the monitoring service 758 may receive the triggering notification and in turn cause the other services of the security assessment system 750 to collect the data and perform the security checks. Additionally or alternatively to being event-driven, the monitoring service 758 may be scheduled or may operate substantially continuously to ensure that successfully provisioned and deployed virtual resource instances maintain a valid configuration and security policy.

Any of the services of the security assessment system 750 may, as needed, access one or more centralized threat data stores or other knowledge bases, internal or external to the computing resource service provider's systems, to obtain information that is supportive to the desired security checks. In one example, such a threat data store may contain information for identifying known threats, and further may include associated information identifying recommended mitigations of the threats; the security assessment system 750 may use this information to provide, to the client, the recommended mitigations of threats identified during the security checks. In another example, such threat data stores may contain information identifying past or ongoing operational issues, security-related user feedback, and/or root-cause analysis, that is associated with the client's virtual computing environment and/or the computing resource service provider's systems. The security assessment system 750 or a separate event management platform may manage the information in the threat data stores, so that disparate security analysis services (e.g., across communicatively isolated regions of the computing resource service provider's systems) have access to the same threat information.

Figure 8:
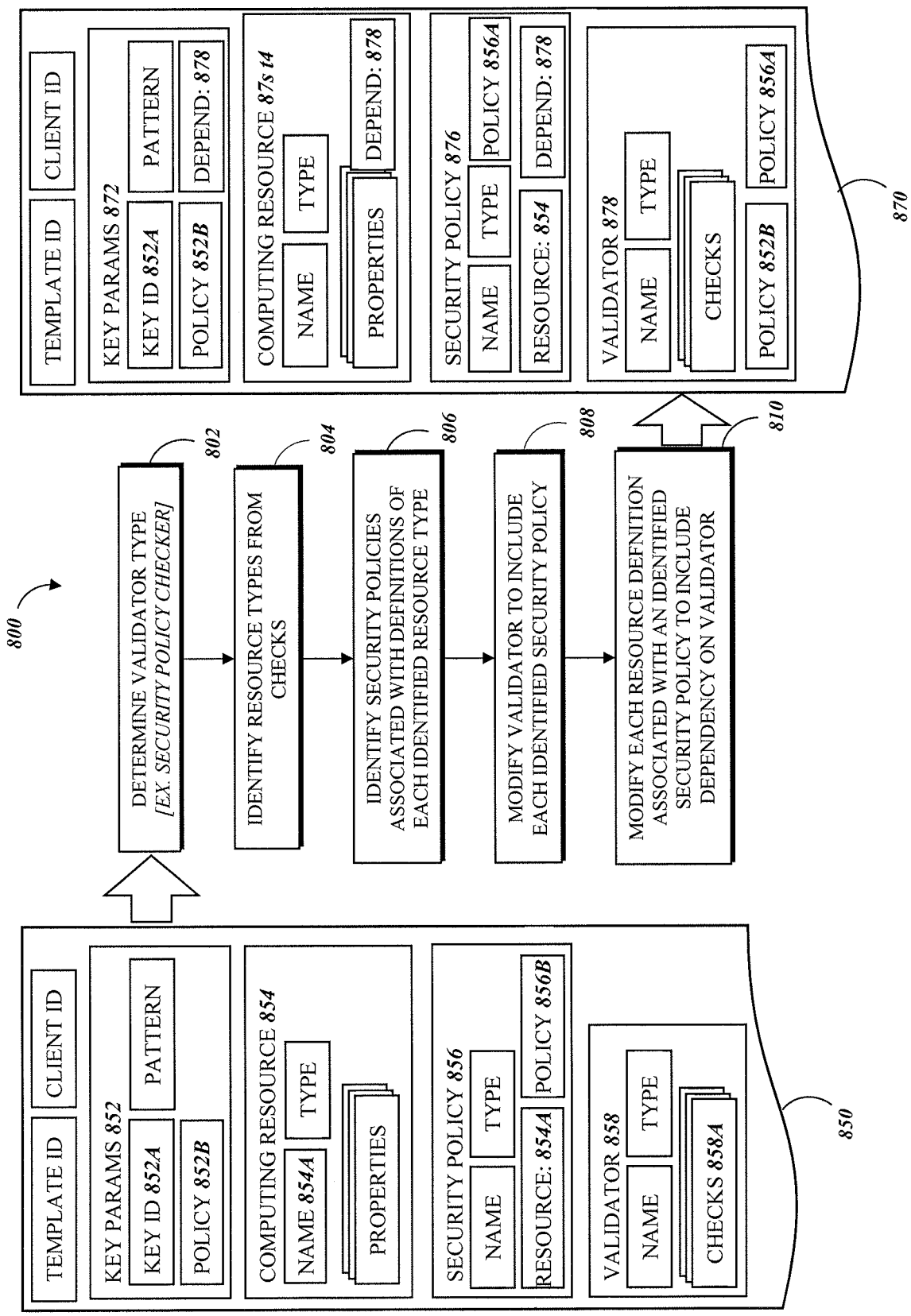
FIG. 8 is a diagram of an example method of transforming a template used to provision and deploy virtual computing resources.

In some embodiments, a client may selectively decide whether to use the present systems and methods of pre-deployment security verification of the client's virtual resources in a computing resource service provider's systems. There therefore may be templates in use that are not optimized to employ the present systems and methods. Once a client chooses to activate these protections, existing and new templates can be optimized to use them. FIG. 8 provides an example method 800, which can be performed by a transformation service, as described above, to receive an existing template 850 and produce, from the template 850, an optimized template 870 that applies a desired set of security checks to requested resources before deployment. In particular, the example transformation method 800 demonstrates optimizing the template 850 so that the pre-deployment security checks can be more efficiently applied to security policies associated with the requested resources, but other types of checking as described above can also be improved by optimizing the template 850. A client user may use an API to access the transformation service and provide a template to be transformed as well as execution parameters that control the transformation.

The example template 850 identifies several resource definitions that the system uses to provision, configure, and deploy virtual resource instances, including a key management definition 852, a computing resource definition 854, a security policy definition 856, and a validator resource definition 858. The instances created from the key management definition 852 and the security policy definition 856 are security resources—they attach and manage access to computing resources, but they are not themselves computing resources—they do not require allocation and provisioning of physical and virtual resources within the virtual computing environment. Rather, in some embodiments creating a security policy instance comprises creating a temporary data structure in memory, which data structure includes all default and all resolved parameter/value pairs; attaching the security policy then comprises adding the temporary data structure to a record or data object of the associated virtual resource instance, such as by storing the data structure in metadata associated with a virtual machine instance. A key management definition 852 may control access by one or more end user accounts to one or more virtual resource instances using cryptographic keys, as described above. The definition 852 may include a primary identifier 852A and an access policy 852B, in addition to default key management properties such as the pattern used to match generated keys. A security policy definition 856 may control access to, and operations of, a virtual resource instance to which a created security policy instance is attached. For example, after the resolved security policy is added to the instance metadata, the frontend, the instance, or another access management service reads the security policy from the metadata in order to determine whether a request for access is authorized. The definition 856 may include a resource identifier that is the name 854A of the computing resource definition 854 that produces virtual resource instances to which the security policy attaches. The definition 856 also includes the security policy 856B or a reference thereto.

The computing resource definition(s) 854 are used to launch virtual computing resource instances, such as virtual machine instances and data store instances. The computing resource definition 854 may include at least a unique name 854A, a resource type, and one or more properties that are used to determine configuration parameters for a corresponding instance. The validator resource definition 858 may produce validator instances that are security resources, computing resources, or a combination of both, depending on the desired use of the validator instance. A validator type may identify what kind of security checks are to be performed, and on what resources. For example, a validator instance created from the definition 858 may have a "policy checker" type, indicating the associated security checks 858A are only applied to security policies and not to other data that can be checked as described above. In one example, the validator resource definition 858 includes the security checks 858A that are to be performed on virtual resource instances before they are launched. Thus, the example validator resource definition 858 may look like this:

```
ValidatorDefinition:                                          {
    Type: CheckPolicy
    Properties:                                               {
        Checks:         [datastore-instance-prohibits-
                        world-readability]
                        [datastore-instance-prohibits-
                        world-writeability]
    }
}
```

Notably though, the template 850 may not identify which security checks 858A apply to which resources and which security policies, and that information must be determined while a request for resources is being processed. The goal of the template transformation is to derive that information and store it in the template itself, so the information only has to be retrieved when a request is received. At step 802, the system may determine the type of the validator resource definition(s) 858 in the template 850. For example, the system may determine the value of the "type" parameter of the definition 858. At step 804, the system may identify the resource types (e.g., virtual machine, message queue service, data store) associated with the designated security checks 858A. In the present example, the checks include the resource type in the name of the check, so the system simply obtains the resource type from the security check name.

In the example, the validator is a security policy checker, so at step 806 the system may identify all of the security policies implicated by the designated security checks. For example, the system may use a first resource type (identified in step 804) to identify all of the computing resource definitions 854 that create a virtual resource instance of the first resource type (e.g., by obtaining the value of the "type" parameter in the computing resource definition 854). Then, for each identified computing resource definition 854, the system may identify the security policy definition 856 associated with the computing resource definition 854 (e.g., by obtaining the value of the resource identifier parameter in the security policy definition 856). Finally, the system may obtain the security policy 856B from the definition 856. This process may be repeated for each resource type identified in step 804.

At step 808, the system may modify the validator resource definition 858 to produce a transformed validator resource definition 878 that includes each security policy identified in step 806, and at step 810 the system may modify each resource definition that is the subject of a security check to create new resource definitions 872, 874, 876 that include a dependency parameter, which creates a condition that, in response to a request for resources created from the transformed template 870, the associated virtual resource instance will not be created unless an instance is first successfully created from the validator resource definition 878. In another embodiment, all of the resource definitions in the template 870 are modified to include the dependency. Thus, examples of the modified security policy definition 876, validator resource definition 878, and computing resource definition 874 are:

```
SecurityPolicyDefinition:                                    {
    Type: datastore-policy
    Properties: {
        ResourceName:                        <sampleDB>
        Policy:                              <policy>
        DependsOn:                           <validator>
    }
}
ComputingResourceDef          <sampleDB>:                    {
    Type:                                    datastore
    DependsOn:                               <validator>
}
ValidatorDefinition           <validator>:                   {
    Type: CheckPolicy
    Properties:                                              {
        Checks:     [datastore-instance-prohibits-
                    world-readability]
                    [datastore-instance-prohibits-
                    world-writeability]
        EvalPolicy: datastore-instance-prohibits-world-  <policy>
                    readability:
                    datastore-instance-prohibits-world-  <policy>
                    writeability:
    }
}
```

The security policies to be checked are thus stored or referenced directly within the validator resource definition 878, so that when the system launches instances from the transformed template 870, it can quickly obtain, create, and attach the relevant security policies to the instances and then perform the security checks on them.

In accordance with the above description, the present disclosure provides, in one embodiment, a system including one or more processors and memory storing computer-executable instructions that, when executed by the one or more processors, cause the system to: receive a request to access computing resources; determine that the request identifies a first virtual computing resource having a first resource type and associated with a first set of configuration parameters; obtain a first security check associated with the first resource type; obtain a second set of configuration parameters predetermined to indicate whether a first virtual resource instance created using the second set of configuration parameters passes the first security check, the first virtual resource instance having the first resource type; and, prior to the computing resources being deployed as part of the first virtual resource instance, in accordance with the request to access computing resources, compare the first set of configuration parameters to the second set of configuration parameters to determine that the first set of configuration parameters passes the first security check.

The first set of configuration parameters may include a first set of security permissions encoded in a first security policy, the second set of configuration parameters may include a second set of security permissions encoded in a second security policy, and, to compare the first set of configuration parameters to the second set of configuration parameters, execution of the instructions causes the system to: determine a first propositional logic expression based at least in part on the first set of security permissions; determine a second propositional logic expression based at least in part on the second set of security permissions; and, compare the first propositional logic expression to the second propositional logic expression to determine that the first security policy passes the first security check. Executing the instructions may further cause the system to: determine that the first request identifies a second virtual computing resource having a second resource type and associated with a third set of configuration parameters; obtain a second security check associated with the second resource type; obtain a fourth set of configuration parameters predetermined to indicate whether a virtual resource instance created using the fourth set of configuration parameters passes the second security check, the second virtual resource instance having the second resource type; compare the third set of configuration parameters to the fourth set of configuration parameters to determine that the third set of configuration parameters does not pass the second security check; and, cause deployment of the first virtual resource instance and a second virtual resource instance, in accordance with the first request, to be denied. Executing the instructions may further cause the system to, subsequent to a determination that the first set of configuration parameters passes the first security check: configure the first virtual resource instance using the first set of configuration parameters; deploy the first virtual resource instance into a virtual computing environment; obtain execution data associated with the first virtual resource instance subsequent to deployment; and compare the execution data to the second set of configuration parameters to determine that a configuration of the first virtual resource instance passes the first security check.

In another embodiment, the present disclosure provides a system including one or more processors and memory storing computer-executable instructions that, when executed by the one or more processors, cause the system to, before causing a virtual computing resource instance to be deployed into a virtual computing environment: identify a first virtual resource definition used to launch the virtual computing resource instance with a first configuration; obtain a first security check comprising one or more security requirements of the first configuration; and, determine whether the first configuration satisfies the one or more security requirements. Executing the instructions may further cause the system to: identify a first template specifying the first virtual resource definition and the first security check; obtain, from the first template, a first set of configuration parameters and information identifying the first security check; and, generate the first configuration from the first set of configuration parameters. The first template may further specify a first security policy definition that defines a first security policy for controlling access to the virtual computing resource instance, and executing the instructions may further cause the system to: obtain, using the first template, the first security policy; and determine whether the first security policy satisfies the one or more security requirements. The one or more security requirements may correspond to access permissions of the virtual computing resource instance, and executing the instructions may further cause the system to: simulate network activity within the virtual computing environment; collect information describing an expected response of the virtual computing resource instance to the network activity, based at least in part on the first configuration; and, determine whether the information indicates that the first configuration satisfies the one or more security requirements.

The instructions, when executed, may cause the system to: obtain one or more data files containing the first configuration; and, perform a static analysis of the one or more data files to determine whether the first configuration satisfies the one or more security requirements. Executing the instructions may further cause the system to: receive a request to deploy the virtual computing resource instance; identify the first virtual resource definition based at least in part on the request. Responsive to a determination that the first configuration satisfies the one or more security requirements, the system may configure the virtual computing resource instance to have the first configuration, and deploy the virtual computing resource instance into the virtual computing environment. Subsequent to deploying the virtual computing resource instance, the system may obtain monitoring data describing network activity associated with the virtual computing resource instance, and determine whether the monitoring data indicates that a deployed configuration of the virtual computing resource instance satisfies the one or more security requirements. To obtain the first security check, executing the instructions may cause the system to: receive, from a client computing device communicatively connected to the one or more processors, a request to configure pre-deployment security analysis of the virtual computing resource instance; allow the client computing device to access an application programming interface (API) for configuring the pre-deployment security analysis; and receive, from the client computing device via the API, an indication to perform the first security check. Executing the instructions may further cause the system to deliver to the client computing device via the API a user interface enabling a client using the client computing device to select the first security check from a set of security checks each associated with a corresponding resource type of a plurality of resource types.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising one or more processors and memory storing computer-executable instructions that, when executed by the one or more processors, cause the system to:
   receive a request to deploy a virtual computing resource instance;
   identify a first virtual resource definition used to launch the virtual computing resource instance with a first configuration based at least in part on the request;
   obtain a first security check comprising one or more security requirements of the first configuration; and
   responsive to a determination that the first configuration satisfies the one or more security requirements:
   configure the virtual computing resource instance to have the first configuration; and
   deploy the virtual computing resource instance into a virtual computing environment; and
   subsequent to deploying the virtual computing resource instance:
   obtain monitoring data describing network activity associated with the virtual computing resource instance; and
   determine whether the monitoring data indicates that a deployed configuration of the virtual computing resource instance satisfies the one or more security requirements.

2. The system of claim 1, wherein executing the instructions further causes the system to:
   identify a first template specifying the first virtual resource definition and the first security check;
   obtain, from the first template, a first set of configuration parameters and information identifying the first security check; and
   generate the first configuration from the first set of configuration parameters.

3. The system of claim 2, wherein the first template further specifies a first security policy definition that defines a first security policy for controlling access to the virtual computing resource instance, and executing the instructions further causes the system to:
   obtain, using the first template, the first security policy; and
   determine whether the first security policy satisfies the one or more security requirements.

4. The system of claim 1, wherein the one or more security requirements correspond to access permissions of the virtual computing resource instance, and executing the instructions further causes the system to:
   simulate network activity within the virtual computing environment;
   collect information describing an expected response of the virtual computing resource instance to the network activity, based at least in part on the first configuration; and
   determine whether the information indicates that the first configuration satisfies the one or more security requirements.

5. The system of claim 1, wherein the instructions, when executed, cause the system to:
   obtain one or more data files comprising the first configuration; and
   perform a static analysis of the one or more data files to determine whether the first configuration satisfies the one or more security requirements.

6. The system of claim 1, wherein to obtain the first security check, executing the instructions causes the system to:
   receive, from a client computing device communicatively connected to the one or more processors, a request to configure pre-deployment security analysis of the virtual computing resource instance;
   allow the client computing device to access an application programming interface (API) for configuring the pre-deployment security analysis; and
   receive, from the client computing device via the API, an indication to perform the first security check.

7. The system of claim 6, wherein executing the instructions further causes the system to deliver to the client computing device via the API a user interface enabling a client using the client computing device to select the first security check from a set of security checks each associated with a corresponding resource type of a plurality of resource types.

8. A system, comprising one or more processors and memory storing computer-executable instructions that, when executed by the one or more processors, cause the system to, before causing a virtual computing resource instance to be deployed into a virtual computing environment to:
- identify a first virtual resource definition used to launch the virtual computing resource instance with a first configuration;
- obtain a first security check comprising one or more security requirements of the first configuration;
- determine that the first configuration satisfies the one or more security requirements;
- identify a first template used to launch:
  - a first virtual computing resource instance as the virtual computing resource instance with the first configuration; and
  - a second virtual computing resource instance with a second configuration and an operational connection to the first virtual computing resource instance, the first template specifying the first virtual resource definition; and
- responsive to a determination that the first configuration does not satisfy the one or more security requirements, deny deployment of both the first virtual computing resource instance and the second virtual computing resource instance.

9. The system of claim 8, wherein executing the instructions further causes the system to:
- obtain a second security check comprising one or more access permissions of the second configuration;
- determine whether the second configuration applies the one or more access permissions to the second virtual computing resource instance;
- responsive to a determination that the second configuration does not apply the one or more access permissions, deny deployment of both the first virtual computing resource instance and the second virtual computing resource instance; and
- responsive to a determination that the first configuration satisfies the one or more security requirements and the second configuration applies the one or more access permissions to the second virtual computing resource instance, cause the first virtual computing resource instance to be deployed with the first configuration into the virtual computing environment and the second virtual computing resource instance to be deployed with the second configuration into the virtual computing environment.

10. The system of claim 8, wherein:
- to determine whether the first configuration satisfies the one or more security requirements, executing the instructions causes the system to obtain evaluation data and compare the evaluation data to one or more stored thresholds;
- the first virtual resource definition includes configuration parameters for creating the first configuration for the first virtual computing resource instance;
- the first template further specifies a validator resource definition that includes the first security check; and
- executing the instructions further causes the system to:
  - receive a request to transform the first template to produce a second template that is optimized for pre-deployment security analysis of virtual computing resources launched using the second template;
  - modify the validator resource definition to produce an optimized validator resource definition that includes the evaluation data or a reference to the evaluation data;
  - modify the first virtual resource definition to produce an optimized virtual resource definition that includes a dependency parameter; and
  - create the second template including the optimized validator resource definition and the optimized virtual resource definition.

11. The system of claim 10, wherein executing the instructions further causes the system to, subsequent to creating the second template:
- receive a request to deploy virtual computing resources into the virtual computing environment;
- determine, based on the request to deploy virtual computing resources, that the second template is to be used to create and deploy the virtual computing resources;
- determine from the dependency parameter and the operational connection that the first virtual computing resource instance and the second virtual computing resource instance should not be provisioned and deployed unless a validator resource instance indicates that the first configuration satisfies the first security check;
- create a validator resource instance based at least in part on the optimized validator resource definition;
- obtain the evaluation data from the optimized validator resource definition;
- compare, using the validator resource instance, the evaluation data to the one or more stored thresholds associated with the one or more security requirements to produce a security check result; and
- responsive to the security check result indicating that the first configuration satisfies the one or more security requirements, cause the first and second virtual computing resource instances to be deployed into the virtual computing environment.

12. The system of claim 8, wherein:
- to determine whether the first configuration satisfies the one or more security requirements, executing the instructions causes the system to obtain evaluation data and compare the evaluation data to one or more stored thresholds;
- the first template specifies a security policy definition that is associated with the first virtual resource definition and identifies a security policy; and
- executing the instructions further causes the system to:
  - obtain the security policy as the evaluation data;
  - receive a request to transform the first template to produce a second template that is optimized for pre-deployment security analysis of virtual computing resources launched using the second template;
  - modify the security policy definition to produce an optimized security policy definition that includes a dependency parameter; and
  - create the second template to further include the optimized security policy definition.

13. The system of claim 8, further comprising an application programming interface (API) for selecting security checks, wherein executing the instructions further causes the system to:
- allow a client computing device to electronically connect to the API;
- receive, from the client computing device via the API, a selection of the first security check from a plurality of security checks; and modify the first template to identify the first security check.

14. The system of claim 13, wherein executing the instructions further causes the system to:
receive, from the client computing device via the API:
the first virtual resource definition including configuration parameters for creating the first configuration for the first virtual computing resource instance; and
a second virtual resource definition that includes configuration parameters for create the second configuration for the second virtual computing resource instance;
to identify the first template, modify an existing template to produce the first template including the first and second virtual resource definitions;
receive, from the client computing device via the API, a request to validate the first template;
determine, based at least in part on the first virtual resource definition, whether the first configuration satisfies the one or more security requirements; and
responsive to a determination that the first configuration does not satisfy the one or more security requirements, send, via the API, a notification to the client computing device indicating that the first template is invalid.

15. The system of claim 8, wherein executing the instructions further causes the system to:
create the first virtual computing resource instance, with the first configuration, and the second virtual computing resource instance, with the second configuration;
collect data from the first virtual computing resource instance and the second virtual computing resource instance to determine that the first configuration does not satisfy the one or more security requirements; and
to deny deployment of both the first virtual computing resource instance and the second virtual computing resource instance, destroy the first virtual computing resource instance and the second virtual computing resource instance.

16. A system, comprising one or more processors and memory storing computer-executable instructions that, when executed by the one or more processors, cause the system to:
receive a request to access computing resources;
determine that the request identifies a first virtual computing resource having a first resource type and associated with a first set of configuration parameters;
obtain a first security check associated with the first resource type and comprising one or more security requirements of the first set of configuration parameters; and
prior to granting access to the first virtual computing resource in accordance with the request, determine whether the first set of configuration parameters satisfies the one or more security requirements, wherein to determine whether the first set of configuration parameters satisfies the one or more security requirements, execution of the instructions further causes the system to:
obtain a second set of configuration parameters predetermined to indicate whether a first virtual resource instance created using the second set of configuration parameters passes the first security check, the first virtual resource instance having the first resource type; and
compare the first set of configuration parameters to the second set of configuration parameters to determine that the first set of configuration parameters passes the first security check.

17. The system of claim 16, wherein executing the instructions further causes the system to:
determine, from the first set of configuration parameters, a first security policy encoding a first set of security permissions;
obtain a second security policy encoding a second set of security permissions that satisfies the one or more security requirements; and
to determine whether the first set of configuration parameters satisfies the one or more security requirements:
determine a first propositional logic expression based at least in part on the first set of security permissions;
determine a second propositional logic expression based at least in part on the second set of security permissions; and
compare the first propositional logic expression to the second propositional logic expression to determine that the first security policy passes the first security check.

18. The system of claim 16, wherein executing the instructions further causes the system to:
determine that the request identifies a second virtual computing resource having a second resource type and associated with a third set of configuration parameters;
obtain a second security check associated with the second resource type;
obtain a fourth set of configuration parameters predetermined to indicate whether a virtual resource instance created using the fourth set of configuration parameters passes the second security check, the second virtual computing resource instance having the second resource type;
compare the third set of configuration parameters to the fourth set of configuration parameters to determine that the third set of configuration parameters does not pass the second security check; and
cause deployment of the first virtual resource instance and a second virtual resource instance, in accordance with the request to access computing resources, to be denied.

* * * * *